(12) United States Patent
Goiffon et al.

(10) Patent No.: US 6,427,230 B1
(45) Date of Patent: Jul. 30, 2002

(54) SYSTEM AND METHOD FOR DEFINING AND MANAGING REUSABLE GROUPS SOFTWARE CONSTRUCTS WITHIN AN OBJECT MANAGEMENT SYSTEM

(75) Inventors: David A. Goiffon, Shoreview; David R. Johnson, Oakdale, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/188,514

(22) Filed: Nov. 9, 1998

(51) Int. Cl.[7] ................................................ G06F 9/44
(52) U.S. Cl. ...................................... 717/108; 717/113
(58) Field of Search ........................ 707/103; 717/107, 717/108, 109, 110, 113, 106

(56) References Cited

U.S. PATENT DOCUMENTS

| | | | | |
|---|---|---|---|---|
| 5,642,511 A | * | 6/1997 | Chow et al. .................... | 717/1 |
| 5,845,119 A | * | 12/1998 | Kozuka et al. ................. | 717/2 |
| 5,867,707 A | * | 2/1999 | Nishida et al. ................. | 717/1 |
| 5,907,704 A | * | 5/1999 | Gudmundson et al. ........ | 717/1 |
| 5,949,998 A | * | 9/1999 | Fowlow et al. ................. | 717/1 |
| 5,991,535 A | * | 11/1999 | Fowlow et al. ................. | 717/2 |

* cited by examiner

*Primary Examiner*—Jack Choules
(74) *Attorney, Agent, or Firm*—Michael B. Atlass; Charles A. Johnson; Mark T. Starr

(57) ABSTRACT

A system for maintaining an object repository within an object management system where the objects are software constructs and the system provides a set of tools for creating packages of the objects that can be reused as well as monitored as they are changed or recombined. The packages themselves become new objects for the repository to store. The set of relationships within a package is also stored as are any relationships between any of the objects within the object management system object repository.

24 Claims, 20 Drawing Sheets

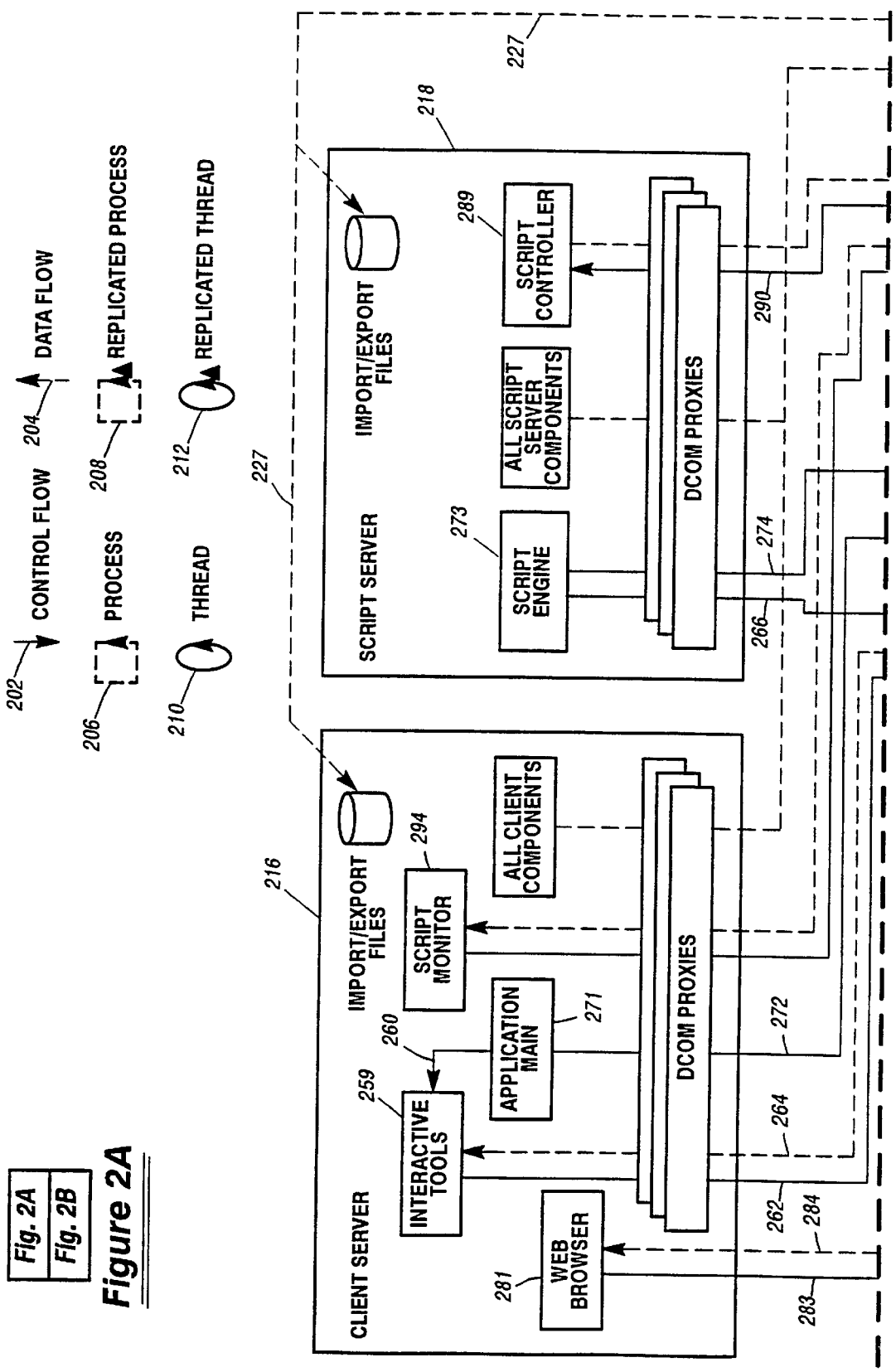

SYSTEM AND METHOD FOR DEFINING AND MANAGING REUSABLE GROUPS SOFTWARE CONSTRUCTS WITHIN AN OBJECT MANAGEMENT SYSTEM

CROSS-REFERENCES

This patent application is related to the co-pending U.S. patent application Ser. No. 09/173,095, entitled, "An Object Management System Supporting the Use of Application Domain Knowledge Mapped to Technology Domain Knowledge", filed Oct. 14, 1998 concurrently herewith by Goiffon et al., which is assigned to the assignee of the present invention, and incorporated herein by reference in its entirety.

This patent application is related to the co-pending U.S. patent application Ser. No. 09/173,423, entitled, "System and Method for Developing a Selectably Expandable Concept-Based Search", filed on Oct. 14, 1998 concurrently herewith by Goiffon et al., which is assigned to the assignee of the present invention, and incorporated herein by reference in its entirety.

BACKGROUND OF THE INVENTION

1. Field of the Invention

This invention relates generally to an improved object management system for tracking, cataloging, and managing data and code modules; and, more specifically, to an object management system and method for using objects storing meta-data to model a reusable group of code of data modules, and to further model the external interfaces presented by the group of code and data modules, the system being used to manage and to analyze the reusable group of code and data modules prior to performing renovation or migration operations on any of the code or data modules included in the group.

2. Background of the Invention

Many of today's software solutions are being designed using an object oriented approach. According to this methodology, a design is broken into code and data modules wherein each module is tailored to perform a discrete function on data to which it is passed. If each module is designed to accomplish the function in a generalized, versus a task-specific, way, the modules may potentially be reused to solve a different task. Using this type of object-oriented approach, a large library of modules can be developed which may be mixed and matched to solve a variety of problems.

Using object oriented design methodology, each reusable code or data module has predefined relationships to other modules. As a simple example, consider a program module that includes instructions that reference data in a table. The program module might be described as having a relationship to the table module of "references". Within a large complex system, thousands of modules and module relationships may be defined. For more information on object-oriented design methodology, see "Object-Oriented System Development" by Dennis de Champeaux, Douglas Lea, and Penelope Faure, published by Addison Wesley, 1993.

Using an object-oriented coding approach, it is possible to develop new solutions using existing functional code and data modules. For example, some of the existing code routines that may apply to a banking system could be similarly applied to a mail-order catalog business. Re-using these pre-existing routines saves development and test time. Another way to re-use code and/or data components involves identifying groups of such modules to be migrated from a first processing environment to a second processing environment. This type of migration operation may require re-implementation of some or all of the code modules into a different coding language, for example, or may involve creating additional layers of code called "wrappers" to bridge the existing code interfaces to the new platform architecture.

A user may also want to identify a pre-existing group of code and data modules so that the particular identified group may undergo a renovation operation. Such operations are necessary to update code and data modules to accommodate changing requirements. A good illustration of this type of operation involves updating code modules to correctly handle dates occurring after Dec. 31, 1999. Another type of renovation effort is needed to allow software to handle the European Monetary Unit (EMU), or "Euro", which will become the common currency within many European countries within the next few years. Still other types of conversion are necessary when porting software between two machines that do not use the same word sizes, or when porting code to a machine having an expanded addressing space.

In all of the above examples, identification of all of the code and data modules needed to form a coherent, integrated application may be a very difficult task. Modules often have complex interdependencies. For example, a program module may call multiple subroutine modules. Each subroutine module may make additional references to databases, tables, or other data structures. The interdependencies must be accounted to when deciding how to group modules for potential re-use. For example, assume a particular program is to be incorporated into a group of modules that can be used to calculate end-of-month bank statements. All related subroutine modules and data structures associated with the bank statement generation and which are referenced by the main program must also be added to the group of modules.

To aid in the development of reusable groups or "packages" of code and data modules, some system is needed to catalog the various interdependencies between these modules. This system would ideally include a user interface that would aid users in understanding the various code and data interdependencies, and would further aid in the selection of the necessary modules.

Additionally, once identification of a complete set of modules has been accomplished, that set should be eligible for reuse within other groups. Also, groups of modules should be cataloged and made eligible for re-use in the same manner lower-level modules are cataloged.

OBJECTS

It is a primary object of the invention to provide an improved object management system for cataloging code and data modules for potential re-use;

It is another object of the invention to provide an object management system for aiding users in selecting a group of re-usable code and data modules that can be used as an integrated package to perform a given task;

It is still another object of the invention to provide an object management system which catalogs each of the code and data modules in the system for re-use using a respective object that stores meta-data describing the respective module;

It is yet another object of the invention to provide an object management system that is model-driven, and that uses objects storing meta-data to catalog each of the code and data modules in the system, wherein each of the objects are of a pre-defined object type as defined in the system model;

It is yet another object of the invention to provide an object management system having an interactive user interface for allowing users to selectively include or omit code or data modules from a reusable group of such modules based on generalized requirements;

It is still another object of the invention to provide an object management system whereby the inclusion of modules within a reusable group of modules can be specified using filters;

It is still another object of the invention to provide an iterative and interactive method whereby a user is capable of locating all re-usable modules included within an object oriented programming environment which are necessary to perform a desired task;

It is yet another object of an invention to provide a system for allowing a user to define groups of re-usable code and data modules, whereby each of the groups so created become available for re-use within other groups of re-usable code and data modules;

It is still another object of the invention to provide an object management system that is model-driven, and that supports the creation of hierarchical code and data packages by combining low-level code and data modules, wherein the hierarchical packages are formed according to package types defined in the model;

It is yet another object of the invention to provide an object management system that supports the creation of groups of reusable code and data modules, wherein the modules contained within a group may be migrated from a first data processing platform to another data processing platform as a functional unit;

It is yet another object of the invention to provide an object management system that supports the creation of groups of reusable code and data modules, wherein the modules contained within a group may be made accessible from external data processing environments through the creation of code wrappers;

It is still another object of the invention to provide an object management system that supports the creation of groups of reusable code and data modules, wherein the modules contained within a group may be operated on as a functional unit for purposes of performing code renovation operations;

It is another object of the invention is to provide a system for allowing various unrelated hierarchical modules, each consisting of low-level re-usable code and data modules, to be included within other hierarchical modules along with interconnecting interface logic included in low-level re-usable code and data modules; and It is still another object of the invention to provide a system having object management tools that operate in a generalized manner on both low-level re-usable code and data modules as well as on hierarchical modules created from multiple low-level modules.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is a system and method for managing re-usable groups of software constructs, including groups of code and data modules. According to the preferred embodiment, each of the code and data modules is modeled by an object for storing data describing the respective code and data module. Relationships between the code and data modules are each modeled by a respective relationship between the objects modeling those code and data modules. A user interface is provided which allows a user to view objects and relationships existing between those objects. The interface further includes various tools for viewing the data stored by the objects, and which aids the user in understanding the interdependencies existing between the respective code and data modules modeled by the objects.

The system includes package creation means for allowing a user to identify packages of software constructs that are associated with a predetermined task. The packages are created to take into account all interdependencies between the included software constructs. That is, a given package includes all of the code and data modules that are necessary and sufficient to perform a given task. Once a package has been created, the identified software constructs can be made the target of a renovation operation, can be migrated to a new platform, can be transformed into a different programming language, or can be made callable from an external platform.

The package creation means operates by allowing a user to identify one or more software constructs that will form the starting point for the package definition. The objects for modeling this initially-identified set of software constructs are displayed via the user interface, along with any relationships between this set of objects and other objects. These relationships between objects are indicative of interdependencies existing between ones of the initially-identified set of software constructs and other software constructs. These relationships are used to identify a second set of software constructs that must be added to the package so that all necessary interdependencies are taken into account. The objects for modeling the second set of software constructs are displayed via the user interface, along with any relationships between this set of objects and other objects, so that the process may be repeated. In this manner, the user may recursively add software constructs to a package of software constructs in a manner that allows all interdependencies between code and data modules to be readily taken into account. When the user has completed the package definition process, all software constructs that are needed to perform a particular task will be included in the package.

According to one aspect of the invention, the user is allowed to select software constructs to be added to the package by defining a filter that is automatically applied against relationships existing between objects. This application of the filter either includes, or omits, objects from the group of objects defining the package of software constructs. Alternatively, the user is allowed to individually include or omit object relationships, and hence objects, to be added to the group of objects defining the package of software constructs.

After the complete package of software constructs has been identified for a given package using the iterative process discussed above, the inclusion of each software construct in the package is recorded. In the preferred embodiment, this is accomplished by creating a package object to model the package. The package object is similar to any of the objects for modeling a respective software construct, and stores data indicative of the software constructs included in the package. A relationship is created between the package object and each object that represents a software construct included in the package. Because the same mechanism that is used to model software constructs is applied to packages, the same user interface and associated tool set may be employed to understand interdependencies existing between software constructs and packages of software constructs. For example, before a particular code module is modified, the object modeling that code module, along with any associated object relationships, can be used to readily determine if the module is included in a package, and if so, whether the potential modification will affect the functionality of the package.

According to another aspect of the invention, external interfaces associated with a package of software constructs may be recorded using interface specifications that are stored in the package objects. Each of these interface specifications describes the external interface of the associated package. That is, an interface specification describes the input and output parameters associated with the package of software constructs in a manner that allows a user to readily understand the functionality provided by the package. This functionality can be readily determined without having to understand the complex interdependencies between the software constructs included in the package. Using the interface specifications, a user may search for software packages that perform desired functions, thus making it easier to reuse these packages to develop new applications. These interface specifications may also be used, for example, by component consumers and component producers to identify a requested software function.

According to yet another aspect of the invention, existing package objects may be used during the creation of still other package objects. That is, package objects may be created that model software packages that include other software packages. According to the preferred embodiment, this is represented by forming relationships between a respective package object and other package objects. This allows interdependencies between packages of software constructs to be recorded and managed. Any number of levels of hierarchy may be created within the package object definitions.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIGS. 2A and 2B, when arranged as shown in FIG. 2, are a block diagram of the preferred embodiment of the Object Manager System within which the current invention operates;

DETAILED DESCRIPTION OF THE PREFERRED EMBODIMENTS

System Environment

Figure 1:
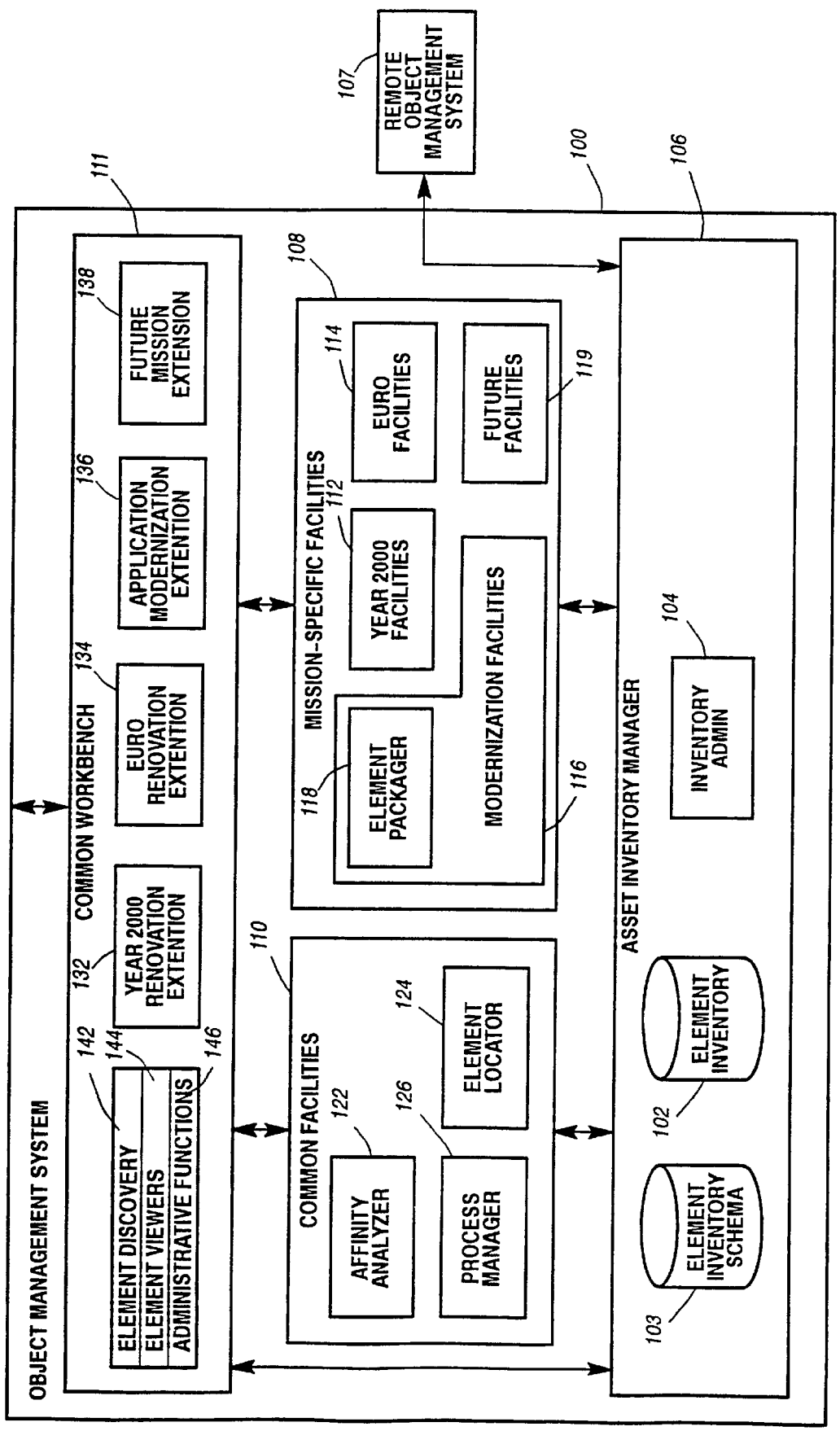
FIG. 1 is a block diagram of the major functional components of the Object Management System 100 within which the current invention operates.

FIG. 1 is a block diagram of the major functional components of the Object Management System 100 within which the current invention operates. The system includes Element Inventory 102, which stores the various objects, or "elements", that are used to manage the code and data components (not shown in FIG. 1) that support an enterprise. Each of the objects stores meta-data, or "data about data". This meta-data describes, among other things, the location of, and the type of, data or code that is stored within the respective component or module residing elsewhere within the system. This meta-data stored in an element also describes the various relationships that the respective data or code module has with other data and/or code modules. In this manner, the elements stored in the Element Inventory 102 serves as an index that points to, and describes, the various data and code resources used to perform the functions of the particular Information Technology (IT) platform which utilizes the Object Management System 100. The Element Inventory 102 may also include objects, or elements, that contain meta-data that points to and describes the processes and tools used by the Object Management System itself According to the preferred embodiment, each element within the Element Inventory 102 is associated with a respective pre-defined element type. Examples of element types are "Table", "TableColumn", or "Program". These element types, which are recorded in a model associated with Element Inventory 102, are stored in the Element Inventory Schema (EIS) 103. The element type associated with a particular element is representative of the functionality of the associated data, code or system component. EIS further stores relationship types, which define how one element type is related to another element type. This will be discussed further below.

The Element Inventory 102 is supported using functions provided by Inventory Administration 104. These support functions include the backup facilities used to make a copy of selected elements, and restore facilities used to restore an existing saved copy of an element to the Element Inventory. The administration functions further include export and import operations provided to exchange information between the Element Inventories of one or more remote Object Management Systems such as that shown as Remote Object Manage System 107. The export function provides a copy of an element to the remote system, whereas the import function receives a copy of an element from a remote system, and stores the copy within the Element Inventory 102. Export/import exchanges are accomplished using self-defining intermediate file structures of the type utilized by various export/import standards such as eXtended Markup Language (XML).

Inventory Administration 104 further includes an archive function. This function is similar to the export operation in that it creates a self-defining intermediate file. Unlike the export function, which allows a copy of an exported element to remain within the Element Inventory 102, the archive function deletes an element from the Element Inventory while retaining an archived record of the element for possible later use.

The Inventory Administration 104 also supports a Migration Function. This function is utilized to copy an element and the corresponding inventory information pertaining to that element between multiple Object Management Systems that are at different release levels.

The Element Inventory 102 and Inventory Administration 104 are managed by the Asset Inventory Manager 106. The Asset Inventory Manager (AIM) is the software that provides an interface to the Element Inventory 102 and Element Inventory Schema 103. One of the functions of the AIM is to hide the underlying repository implementation by providing an Application Program Interface (API) tailored for elements. The AIM provides an interface that supports the operations required by both the Mission Specific Facilities, shown in Block 108, and the Common Facilities, shown in Block 110.

The types of Mission-Specific Facilities shown in Block 108 may vary between Object Management Systems as required by the needs of the users. These include the renovation and transformation tools that are used to adapt existing software to changing user requirements. When tools are installed, they are registered in the Element Inventory 102. That is, for each tool, one or more elements are created that define each of the tools, and that define the types of relationships these tools may have with other code and/or data constructs within the system. Thus, the tools that are used by the Object Management System are inventoried in a similar manner to all other code and data constructs within the system.

New versions of tools may be installed over time. When this occurs, updated versions of the associated elements are also created and interrelated. The relationship between a version of a tool and elements created by the tool are also recorded in the Element Inventory. Tool administering functions are performed using the graphical user interface associated with the Common Workbench 111.

FIG. 1 illustrates some of the Mission-Specific Facilities, or tools, that will be commonly provided by the Object Management System 100 of the preferred embodiment, including the Year 2000 Facilities 112, the Euro Facilities 114, and the Modernization Facilities 116. The Year 2000 Facilities 112 contain the user interfaces, tools, protocols, and processes required to support analysis and renovation of applications to be ready for the year 2000. Euro Facilities 114 include the user interfaces, tools, protocols, and processes required to convert business applications into code which handles the new European Monetary Unit (Euro).

Mission-Specific Facilities 108 further includes Modernization Facilities 116. Modernization Facilities involves the user interfaces, tools, protocols, and processes that are required to integrate new applications with existing applications and/or to re-implement all or parts of existing applications within different systems and platforms, or using different software technologies.

Each of the Mission-Specific Facilities will generally be invoked on a group of related code and data components. To locate the related code and data components on which these Mission-Specific Facilities will be invoked, some type of element identification function must be invoked using the relationships defined within Element Inventory 102. In the current Object Management System 100, the relationships exist as integrated application and technology mappings so that code and data components can be discovered in a single, automated process. This greatly reduces the amount of time and effort required to perform this task, as will be discussed below.

After a group of code or data components have been identified as the target of some type of renovation or transformation operation, Element Packager 118 is utilized to build the identified elements into a package that includes all of the code and data necessary to transform the group of components. To perform this function, the Element Packager must extract additional information about each of the elements from Element Inventory 102. The current application relates to the functionality provided by the Element Packager 118, as will be described in detail below.

After element packaging is completed, the Modernization Facilities 116 are used to perform some type of transformation operation on the Element Package. This may be accomplished by either wrapping all, or part, of an existing Element Package with layers of software called a "wrapper" that provide an interface bridge between the wrapped elements that makes that package accessible from a different operating environment. Alternatively, some of the elements in the package may be entirely re-implemented using a new technology.

The Mission-Specific Facilities shown in FIG. 1 are exemplary only. Still other types of tools could be included within the current Object Management System 100, including, but not limited to, facilities to migrate software to platforms having a different word size or address-space size. These are represented by Future Facilities 119.

Object Management System 100 further includes Common Facilities 110. These functions aid the user in understanding the relationships between elements, and also aid in invoking the tools used to perform the transformation and renovation operations. Common Facilities 110 include the Affinity Analyzer 122, which is a tool that analyzes the relationships existing between various elements contained within the Element Inventory 102. For example, the Affinity Analyzer determines which elements are involved in the processing performed to accomplish a particular function. The Affinity Analyzer 122 further provides a graphic display representing the various elements and element relationships for those code and data components provided by the IT platform. The graphical displays, which are capable of illustrating complex element networks, are used for advanced impact analysis and element packaging purposes. For example, before a particular code module is modified, the relationships existing between the associated element modeling that code module and other elements may be used to determine which other code or data components need to be modified to maintain compatibility. These relationships may be graphically depicted using the Affinity Analyzer 122. The Affinity Analyzer allows software analysts to interrogate and visually mine single or disparate sets of elements without having to understand the details of the elements or relationships. Query and exploration, hypothesis generation, and knowledge discovery routines eliminate the need to compose complex queries for investigating how various code and data components are structured or interrelate. In the preferred embodiment, the Affinity Analyzer is implemented using the Netmap tool commercially available from the Alta Corporation.

The Common Facilities 110 further comprises the Element Locator 124. This tool uses Natural Language Understanding (NLU) technology to locate potentially reusable elements in the Element Inventory 102. This makes the information stored in the Element Inventory more accessible to other environments since the details of Element Inventory structure do not have to be known from outside the local system. The Element Locator 124 is able to perform a very efficient "concept" search using application domain mappings stored in the Element Inventory 102. The Element Locator 124 is described in detail in the copending application entitled "An Object Management System Supporting the Use of Application Domain Knowledge Mapped to Technology Domain Knowledge" referenced above.

Also included in the Common Facilities 110 is the Process Manager 126. The Process Manager provides a mechanism whereby a user can discover, inventory, and transform elements with a minimum number of keystrokes using scripted sequences of tool invocations called "plans".

A user accesses both Common Facilities 110 and the Mission-Specific Facilities 108 through a graphical user interface represented on FIG. 1 as the Common Workbench (Workbench) 111. In the preferred embodiment, Object Management System 100 is a web-based system having a "web-like" interface, although other types of interfaces, graphical or non-graphical, could be utilized. The Workbench 111 is shown providing selections for Year 2000 Renovation 132, Euro Renovation 134, Application Modernization 136, and any other additional future extension, shown as Future Mission Extension 138, that may be needed.

Also included in the Workbench 111 are functions that allow the user to manage, view, and report on the elements and element relationships existing within the Element Inventory 102. These tools include Element Discovery Functions 142. Element discovery refers to the process of initially creating elements and the relationships among elements in the Element Inventory. Generally, an Element Discovery Function will analyze a target group of software and data constructs and the interrelationships between these constructs. The Element Discovery Function will then automatically create elements associated with the code and data constructs. If the Object Management System is model driven, the Element Discovery Function 142 will utilize the various element type definitions stored within the model, for example, "program" or "database", to create the elements. As discussed above, each of these elements includes meta-data that describes the location and function of the associated code or data element. This meta-data will further describe the relationships that an element has with other elements, wherein each element relationship models the relationship between the associated code or data construct and other code or data constructs represented by the related elements. The Element Discovery Function will generally create a group of elements that may then be stored within the Element Inventory 102, and which then become available as part of the system knowledge base to manage the associated code and data components.

A wide variety of vendor tools are available to perform Element Discovery Functions 142. For example, the Fulcrum tool commercially available from the RMC Limited Corporation (U.K.) is capable of automatically analyzing Cobol code constructs and related data structures. This tool must be synchronized with the element types included within a model and stored within the Element Inventory Schema 103. This synchronization allows Fulcrum to create elements having recognized element types and relationship types, and that are consistent with other element types used within the system. Many other types of tools are available for analyzing code and data constructs of various other types of software languages. The type of Element Discovery Functions 142 which are available within a given Object Management System 100 will vary depending on the types of IT functions and technologies that are supported by that system.

Once elements and element relationships are created and recorded within the Element Inventory 102, the related code and data entities can be managed, and become available as potential building blocks to form larger applications. Element Packager 118 can be used to locate groups of elements associated with a particular application or applications so that one or more of the Mission-Specific Facilities can be performed on the element group in a manner to be discussed in detail below.

The system further includes several element view functions shown collectively as Element Viewers 144. Element Viewers allow a user to see the elements and element relationships that are stored within Element Inventory 102, and in some cases may be used to create new relationships between existing elements. Four main view functions, or "views", are provided by the Element Viewers 144. The first view, which provides the default view of Object Management System 100, is the Element Explorer View. This view informs the user of the elements/element type matchings. (For example, the view will inform a user that an element is of the element type "TableColumn", "Table", or "Program".) This view allows a user to specify a particular element type as defined within the EIS 103, and in response, provides a list of all of the elements stored within the Element Inventory 102 that are of the type specified. This view further allows a user to create a new element using a selected element type. When a new element is created, memory is allocated within Element Inventory 102. The user can then manually enter the meta-data that will be stored in the new element. For example, the user may enter the location of the associated code, data, or system component, and may manually enter the relationship information that will relate the newly created element to other elements. Element creation will be discussed further below.

From the default Element Explorer View, the user is able to select one of the other views, including the Properties View, Relationships View, or Affinity View. The Properties View enables the user to view the list of attributes associated with a selected element or element type, and which are stored within the Element Inventory 102. Attributes provide additional information about the code and data module associated with, and described by, the selected element, as will be described further below. The Relationships View is a graphic illustration of the relationships existing between a selected element and other elements, or between a selected element type and other element types. This view further allows a user to create new relationships for that element. This will be described further below. In comparison to the Relationships View, the Affinity View provides a more distant view of a chain of related elements. The Affinity View takes as input a user-provided starting element or element type and an ending element or element type, and displays the starting element, the ending element, and all elements and element relationships which provide the chain, or "slice" of interconnections leading from the starting element to the ending element. A similar view is provided between a specified starting element type and a specified ending element type. The relationships which are provided in these views represent relationships between the code and data modules that are stored elsewhere, and that are modeled by the elements.

Workbench 111 further provides Administration Functions 146 to administer the Element Inventory.

Object Management System Subsystems and Interfaces

Figure 2B:
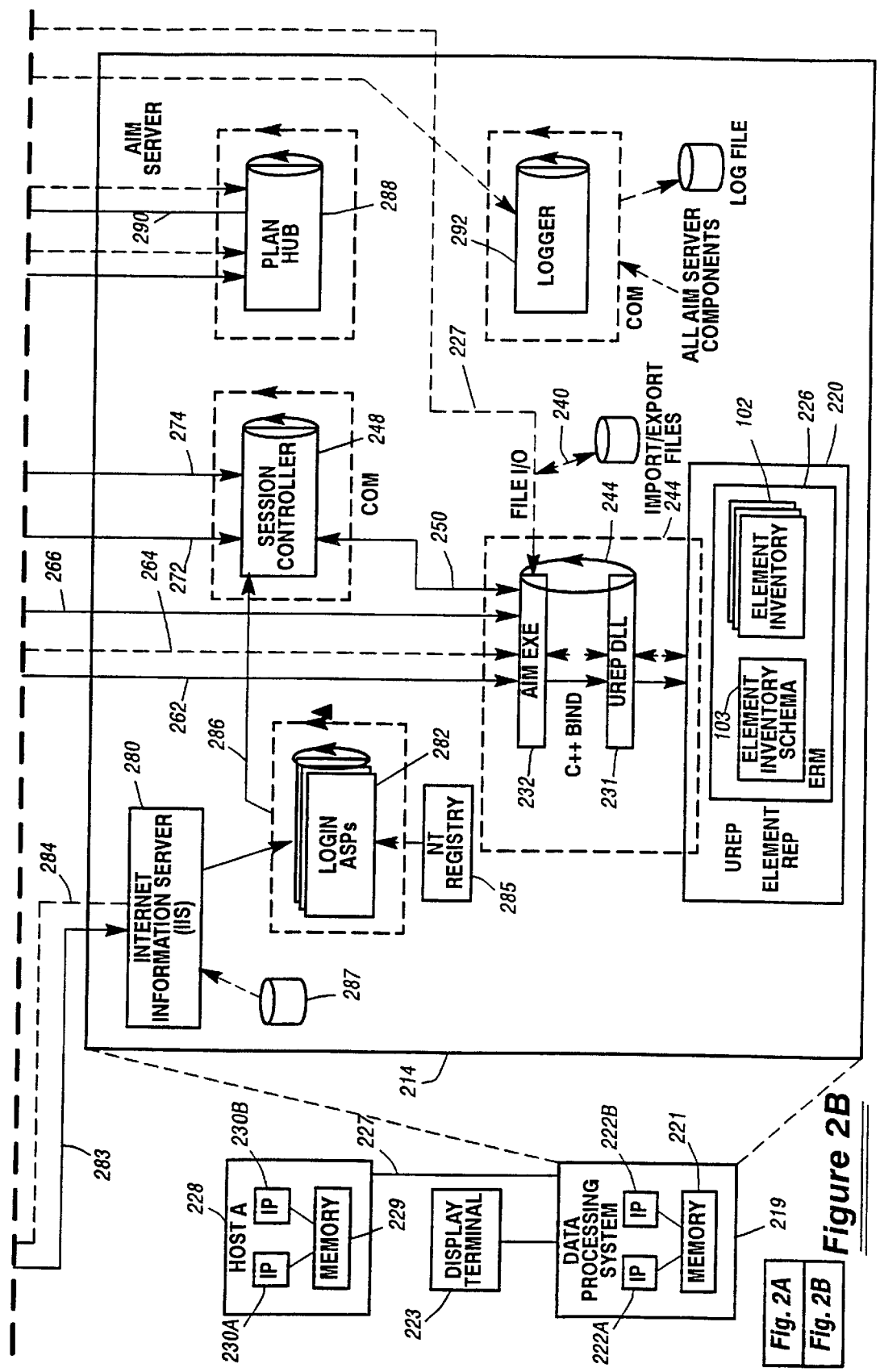

FIGS. 2A and 2B, when arranged as shown in FIG. 2, are a block diagram of the preferred embodiment of the Object Management System within which the current invention operates. In this diagram, process control flow is represented by a solid arrow, and data flow is represented by a dashed arrow, as shown by control flow indicator 202 and data flow indicator 204, respectively. It may be noted that in FIG. 2, any of the dashed arrows representing data flow indicators are implemented as network interconnections. A dashed box with an arrow represents a process, and a dashed box with a double arrow represents a replicated process, as shown by process and replicated process indicators 206 and 208, respectively. A solid loop with an arrow represents a thread, and a solid loop with a double arrow represents a replicated thread, as shown by thread and replicated thread indicators 210 and 212, respectively.

According to the preferred embodiment, the functionality embodied within Object Management System can be physically divided into three servers, the Asset Inventory Manager (AIM) Server 214, the Client Server 216, and the Script Server 218. The AIM Server 214 supports the Element Inventory 102, Inventory Administration 104, and the Asset Inventory Manager 106. The Client Server provides the user interface to AIM Server 214, and supports the Common Workbench 111, the Mission-Specific Facilities 108, and the Common Facilities 110 shown in FIG. 1. Finally, the Script Server 218 supports execution of various scripts that are used to execute the scripted plans described above in reference to Process Manager 126.

The software constructs shown as AIM Server 214 reside on a data processing system such as that shown in FIG. 2 as Data Processing System 219. Data Processing System 219 includes Memory 221 intercoupled to one or more Instruction Processors (IPs) shown as IP 222A and IP 222B. Data Processing System 219 has one or more user interfaces such as Display Terminal 223.

Client Server 216 and Script Server 218 may reside on the same Data Processing System 219, or on similar data processing systems (not shown) intercoupled to Data Processing System 219 via network interconnections. In an alternatively embodiment, Object Management System has multiple Client Servers 216 and multiple Script Servers 218.

The AIM Server

AIM Server 214 includes Element Repository (ER) 220, which is the repository that stores and manages persistent objects (elements). ER 220 may be implemented across multiple hosts interconnected by a remote interface. In the preferred embodiment shown in FIG. 2, the ER is implemented using the Unisys Universal Repository (UREP) commercially available from the Unisys Corporation, although other types of repositories could be utilized including, but not limited to, a Microsoft Repository commercially available from the Microsoft Corporation. Unisys Universal Repository (UREP) is a fully object-oriented repository for providing access to, concurrent sharing of, and immediate update support of all objects stored within the repository. For more information on the UREP system from Unisys, see the UREP Technical Overview, Document Number 8807 6971-000 available from the Unisys Corporation, and which is incorporated herein by reference in its entirety.

In the preferred embodiment, the Element Repository 220 is loaded with the Element Repository Model (ERM) 226. The ERM is an object model which defines objects within ER 220 used to store the element types, relationship types, elements, and relationships.

Within the ERM, the model that defines the various element types is called the Element Inventory Schema (EIS) 103, as discussed above. This model is installed in the Element Repository at system installation time, but may be varied throughout the life of the system. The model definition may be specific to a particular Object Management System. The Element type definitions within EIS 103 provide the templates used during element creation, and define the type of information contained in, the attributes associated with, and the relationships existing between, the elements.

In addition to the EIS, the ERM further contains the Element Inventory 102. The Element Inventory, which is discussed above in reference to FIG. 1, is the collection of elements, each of which is an object storing meta-data about other code, data, or system entities residing elsewhere. This meta-data describes, either directly or indirectly, where the respective entity resides (for example, which directory and server stores the entity). It may be remembered that numerous network interconnections exist within the current Object Management System, and each are depicted by an instance of data flow indicators 204. Any of these network interconnections may interface to another development server storing code, data, or system modules represented and managed by the elements stored in Element Inventory 102. For example, FIG. 2 shows a network interconnection represented by Line 224 connecting a Host A 228 to Data Processing System 219. Host A 228 includes Memory 229 which stores code and data modules (not shown). Memory 229 is interconnected to one or more IPs shown as IP 230A and IP 230B for executing instructions, and for aiding in the development of, and the execution of, any of the code and/or data modules. Multiple hosts of the type represented by Host A 228 may be interconnected to Object Management System 100 so that data, code or system modules developed and stored on the host may be managed and cataloged by Object Management System. Alternatively, a host such as Host A 228 that is managed by Object Management System 100 need not be interconnected to Object Management System 100. In that case, any information exchange being conducted between the two systems would occur via a tangible medium (such as by tapes.)

The meta-data included in each of the elements of Element Inventory 102 further describes the relationships the element has with other elements. As discussed above, these relationships model the relationships the associated data, code or system module has with other modules. In the preferred embodiment, the types of meta-data stored within a particular element, as well as the types of relationships that may be created for a particular element, are dictated by the element type associated with the element. The definitions for element types are stored within the model in the EIS 103. This is discussed in detail below.

The Element Repository is accessed using the UREP Dynamic Link Library (DLL) 231. This DLL provides programmatic access to objects stored in ER 220, including objects of ERM 226.

The UREP DLL 231 interfaces with the Asset Inventory Manager Executable (AIM EXE) 232. The AIM EXE implements the Asset Inventory Manager 106 function of FIG. 1. As discussed above, one of the functions of the AIM EXE 232 is to provide an interface to the Element Repository 220 that hides the underlying repository implementation. For example, the services provided by the AIM EXE hide the functions provided by the UREP DLL 231. The AIM EXE further masks the user from any transaction management and database locking that is required to accomplish a given task. The AIM EXE does so by providing an Application Program Interface (API) that supports the operations required by the entities accessing the various elements stored within the Element Inventory 102.

The following services are provided by the AIM EXE. Various ones of these services are called by the Element Discovery Functions 142, and Element Viewers 144 to perform the tasks discussed above:

Connect: This service connects the session to the Element Repository. This service further opens the repository, makes a repository log entry in the newly created object, and begins a UREP session.

Disconnect: This service disconnects the session from the Element Repository. In the preferred embodiment, this is accomplished by ending the UREP session and closing the repository. This service is called with a parameter that indicates whether uncommitted changes should be discarded. If uncommitted changes exist which are not to be discarded, the request for this service is disregarded.

Export Element Types: This service reads element types from the EIS 103 and writes them into a file in a predetermined format as shown by dashed line 240. In the preferred embodiment, this format is XML. This service is called by scripts which execute on the Script Server 218.

Import Element Types: This service reads element types from a file and writes them into the EIS 103 in a predetermined format, which in the preferred embodiment is XML format, and is shown by dashed line 240. This service is called by scripts that execute on the Script Server 218. The element types are installed at initialization time, and may be updated as desired during the life of a system.

Get Element Types: This service reads element types from the EIS 103 and returns them to the caller in an output parameter. In the preferred embodiment, the output format is XML.

Put Element Types: This service reads element types from an input parameter and writes them to the EIS 103. In the preferred embodiment, the input format is XML.

Export Elements: This service reads elements from the Element Inventory 102 and writes them into a file as is indicated by dashed line 240. This service is called by scripts executing on either the Client Server 216 or the Script Server 218.

Import Elements: A service which reads elements from a file and writes them into the Element Inventory 102 as indicated by dashed line 240. This service includes options for handling already-existing elements, including the Ignore, Overwrite, and Create New Version options. This service is called by scripts executing on either the Client Server 216 or the Script Server 218.

Get Elements: A service that reads elements from the Element Inventory 102 and returns them to the caller in an output parameter. This service is called by various ones of the Interactive Tools 259. The element that is to be retrieved may be specified according to an element name, or may be specified using relationship data used to address a particular element within the Element Inventory. Another option for this service allows an element to be specified for retrieval according to a particular character string that the element stores.

Get Element for Update: A service called by various ones of the Interactive Tools. This service sets an update lock on an element for a particular session, then reads the selected element from the Element Inventory 102 so that it is returned to the requester as an output parameter. The selected element may be specified by element name, or may be specified using relationship data used to address an element within the Element Inventory. Another option allows the selected element to be specified according to particular character string that the element stores.

Create Elements: A service called by the Interactive Tools, and that provides elements as input parameters so that they can be written to the Element Inventory 102.

Update Element: A service called by the Interactive Tools 259 for providing elements as input parameters so that they can be written to the Element Inventory 102. This service must be preceded by a call to "Get Element for Update" service.

Delete Elements: A service called by the Interactive Tools 259 that deletes specified elements from the Element Inventory 102.

Get BLOB: A service called by Interactive Tools 259 that reads a Binary Large Object (BLOB) attribute from an Element in the Element Inventory 102 and writes it into a file. The file can reside on a remote host, specified by a Universal Naming Convention (UNC) name.

Get BLOB for Update: A service called by Interactive Tools which sets an update lock for this session on a BLOB Element in the Element Inventory 102, reads its BLOB attribute, and writes the BLOB attribute into a file. The file can be on a remote host, specified by UNC name.

Update BLOB: This service, which is called by the Interactive Tools, reads a BLOB from a file, and writes the BLOB as an attribute of a BLOB Element in the Element Repository 102. The file can be on a remote host, specified by UNC name. This service call must be preceded by Get BLOB for Update.

Save: A service which commits all uncommitted changes to the Element Inventory 102. When invoked from interactive session, this service also saves a description of the state of the Common Workbench 111, including the state for any executing Interactive Tools.

Undo Last: A service that rolls back the last uncommitted change to the Element Inventory 102. This service may be called by either Interactive Tools 259 or by scripts.

Undo All: This service rolls back all uncommitted changes to the Inventory, if any such uncommitted changes exist. This service may be called by either the Interactive Tools 259 or scripts.

An instance of the AIM EXE 232 is created for each session that is active on the AIM server. If multiple sessions are active, multiple instances of the AIM EXE will be active at once. This is indicated by the replicated process indicator 244.

Creation of the AIM EXE 232 is performed by the Session Controller 248 as is indicated by control flow indicator 250. Creation of the AIM EXE invokes the "Connect" service to establish a session with the Element Repository 220. A session is ended when the Session Controller 248 calls the AIM EXE "Disconnect" service.

In the preferred embodiment, the Session Controller 248 is an NT service that is started automatically at AIM Server boot-up or manually by the administrator. The Session Controller is responsible for generating begin and end session requests in response to user requests received from Application Main 271 running on Client Server 216 to log in and log off the Object Management System, respectively. These requests are represented by control flow indicator 272. Such requests may also be received by the Session Controller 248 from script execution on Script Engine 273, as shown by control flow indicator 274. The Session Controller is also responsible for receiving administrator requests to terminate orphaned sessions by destroying orphaned COM objects.

The browser-level client interface to AIM Server 214 is provided by the Internet Information Server (IIS) 280. In the preferred embodiment, IIS 280 responds to requests from Web Browser 281 by delivering login Active Server Pages (ASPs) 282 to the user for allowing login functions to be performed. The requests are represented by control flow indicator 283, and the IIS responses are represented by data flow indicator 284. IIS returns an HTML page which displays the names of the Object Management Systems if more than one system is available to the user, and further directs the user to the URL of the selected login form ASP. The URLs for the login form ASP is obtained from NT Registry 285, which stores system persistent data such as system names and ASP URLs that cannot, or should not, be held in the Element Repository 220.

A login form ASP returns an HTML page to the client. This ASP contains a form in which the user enters login information such as a user id and password. The user is then directed to the Login Request ASP, which sends the entered information to the Session Controller 248 for validation, as shown by control flow indicator 286. If a session is not successfully created for the user, an HTML page is returned to the client requesting that the information be reentered. Otherwise, a session is established.

Once a user is logged in, the client-side application files for the Object Management System are downloaded from Mass Storage 287 to the Client Server 216, and Application Main 271 on Client Server begins execution. Thereafter, further communication between Client 216 and AIM Server 214 is performed via the Session Controller 248 using Distributed Component Object Module (DCOM) protocol, as shown by control flow indicator 272.

The AIM Server 214 further includes Plan Hub 288, which acts as a central router for script execution requests and script execution status. The Plan Hub receives requests for script execution from the Client Server 216, and forwards these requests to a specified Script Controller 289, which is the process executing on Script Server 218. These requests are represented by control flow indicator 290. In the preferred embodiment, Plan Hub is an NT service, is started automatically when the AIM Server is booted, and may also be started manually by a system administrator.

AIM Server 214 also includes Logger 292, which is an NT service that receives script execution status from Script Controller 289 so that this status can be recorded.

Client Server

Turning now to a description of the Client Server 216, a user establishes a session with the AIM Server by invoking the URLs of Login ASPs using Web Browser 281. The user receives HTML login pages and application files from IIS 280. Once a user is logged in and a session is established for the user, communication between client and server is via DCOM, although the browser session is maintained.

Application Main 271 is the main client-side process supporting the object management functions. As an executable, the process for Application Main is started at creation. Application Main provides for the start-up of the individual Interactive Tools 259 via the interface shown as Line 260. Application Main further has access to ones of the global services such as Save, Undo, and Logoff, which are provided by the AIM EXE 232.

Invocation of Interactive Tools 259 by Application Main starts each of the Interactive Tools at its logical starting point. These tools provide the Mission-Specific Facilities 108, the Common Facilities 110, and the Common Workbench capabilities 111 of FIG. 1. These tools call services provided by the AIM EXE to perform functions such as retrieving element type definitions from the EIS 103, retrieving element data from the Element Inventory 102, making requests for the creation of new elements according to the EIS model, or making requests to modify existing elements. These requests are shown in FIG. 2 as Control Flow Indicator 262 and Data Flow Indicator 264. A new thread is started when one of the Interactive Tools 259 begins communicating with the AIM EXE 232. When a request from Interactive Tools 259 is processed successfully by AIM EXE, notification of changes to data in the ER 220 is returned by the AIM EXE 232 via Session Controller 248 to Application Main 271, which then forwards the notification to Interactive Tools 259 via the interface shown as Line 260.

Script Server

The AIM EXE 232 further communicates with Script Server 218. Within Script Server 218, Script Controller 289 accepts requests from the Plan Hub 288 to execute a Plan, which is a scripted invocation of services provided by AIM EXE 232, and/or programmatic tool invocations. In response, the Script Controller reads a requested scripted plan, which is stored as an element in the Element Inventory 102, via the AIM EXE 232 as indicated by control flow 266. Thereafter, Script Controller 289 forks a process in which the plan is executed by Script Engine 273. The Script Controller further sends periodic notifications to the Plan Hub 288 to report on the script execution status. Upon termination of the script, the Script Controller writes an element that is a plan completion record to the Element Inventory 102 and notifies the Plan Hub.

Detailed Description of the Element Inventory Schema and Domain Mappings

Figure 3:
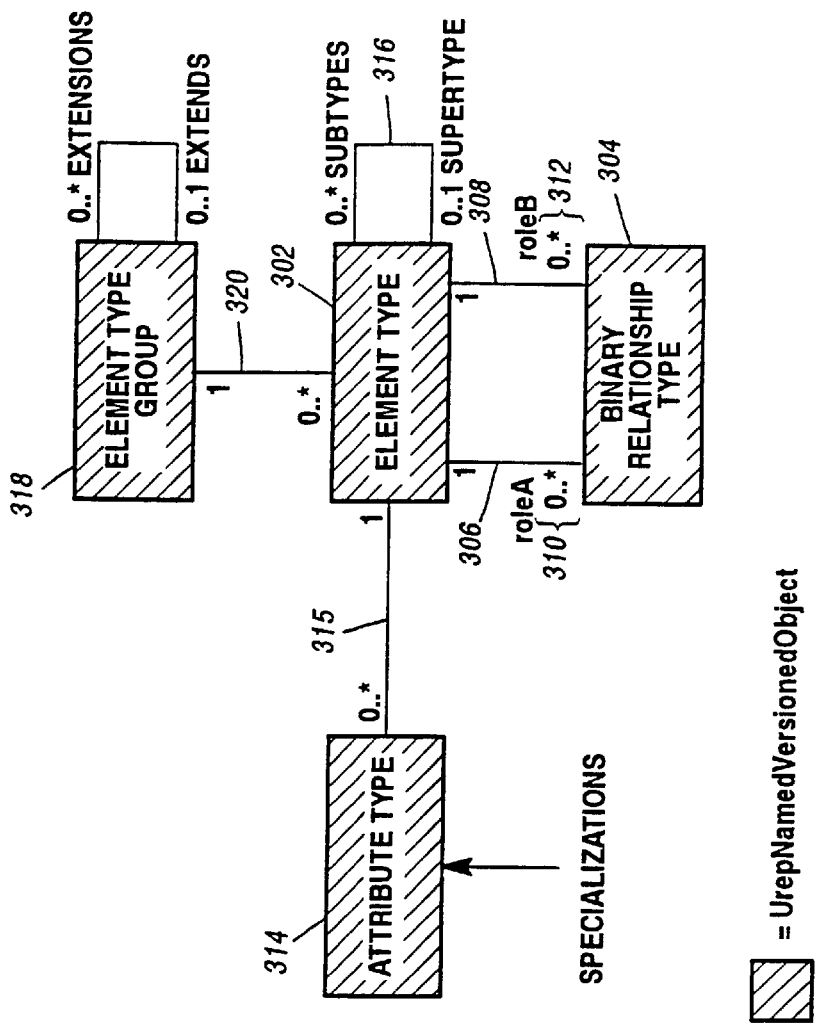
FIG. 3 is a block diagram of the generalized model for the Element Inventory Schema (EIS)

FIG. 3 is a block diagram of the generalized model for the Element Inventory Schema (EIS). As discussed above, the preferred embodiment of the Object Management System 100 utilizes a model loaded within EIS 103 which includes the element type definitions as represented by Element Type 302. Each element type may represent a particular type of software construct or data structure for a code or data module existing within one of the host systems interconnected to Object Management System 100. Examples of element types include "table", "program", "database", "application", and "transaction management system". As many element types may be defined as is necessary to support a given mission of the data processing systems that are managed by Object Management System 100. Generally, a set of element types will be loaded when the Object Management System is initialized. The model is flexible, and may be updated during the life of the system using service calls to the AIM EXE 232 such as "Put Element Types" and "Import Element Types".

Each element type has predefined Binary Relationship Type 304 with one or more other element types, as is represented by Block 304. For example, an element type of "table" has a binary relationship type with an element of type "column". This relationship represents the fact that an element of type "table" may be created within Element Inventory 102 to represent a data module existing on one of the host systems interconnected to the Object Management System 100. The actual table may include one or more columns, and each of these columns will be represented by other elements of type "column" that are also stored in the Element Inventory 102. To restate, each element type 302 represents a type of a potentially reusable code or data module located on various host systems managed by Object Management System 100. The relationship types that exist between element types represent various relationship types that exist between the reusable code and data modules.

Returning to the above example, it may be said an element type of "table" has a Binary Relationship Type 304 of "includes" with an element type of "column". Looking at the relationship from another viewpoint, it may be said an element of type "column" is "included by" an element of type "table". Thus "includes" and "included by" defines the roleA and roleB associated with the relationship between table elements and column elements, as is represented by lines 306 and 308, respectively. A given element type may be associated with zero or more relationships of a particular Binary Relationship Type 304. This is indicated by vectors 310 and 312.

An Element Type 302 may each be associated with one or more Attribute Types such as Attribute Type 314, as is represented by Line 315. An Attribute Type is a type of fact that may be stored about an element. "Comment" or "Data type" is an example of attribute types. More than one attribute type may be stored for a given element type.

The element type definitions are hierarchical. A given element type may include element sub-types below it in the element hierarchy, and may be included within an element super-type that is above it in the hierarchy. For example, an element type "Information System Tool" could include sub-types such as "compiler". Element super-types for "Information System Tool" could be "Tool" generally. Element types each inherits the defined attribute types associated with the super-type immediately above it in the hierarchy. This includes the ability to form the relationship types that the super-type was capable of forming. The definitional hierarchy implemented by subtypes and super-types is represented by line 316.

Multiple element types may be grouped into categories, each of which is referred to as an Element Type Group 318. This grouping is represented by line 320. In the preferred embodiment, three Element Type Groups exist: a Locator Element Type Group, a System Element Type Group, and an Asset Element Type Group.

The Locator Element Type Group includes all element types that define elements that store the various tasks or applications that are performed by the code, data and system components represented by the Asset Elements. A detailed description of the use of the Locator Element Type Group is described in the co-pending application entitled "An Object Management System Supporting the Use of Application Domain Knowledge Mapped to Technology Domain Knowledge" referenced above. The System Element Type Group includes all element types that define the elements that contain meta-data about the tool set of the Object Management System. For example, elements of this type will store meta-data describing the various relationships, and the locations of, the tools shown in FIG. 1 as Mission-Specific Facilities 108 and Common Facilities 110.

The current invention is primarily related to the Asset Element Type Group. The Asset Element Type Group includes all element types that define elements that represent code, data, or system components, for example, the elements that model code, data, or system components stored on Host A 228. The Asset Element Type Group includes Asset Element Types that are "discrete", and other Asset Element Types that are "abstract". A discrete Asset Element Type is a type that is assigned to actual elements stored within the Element Inventory 102. In contrast, the Asset Element types that are "abstract" are created as broad categorizations in which to group multiple other element types for convenience, and so that some element manipulation functions can be performed on the elements so grouped. This is largely beyond the scope of this invention. However, the use of discrete Asset Elements will be discussed below in creating Element Packages.

In the preferred embodiment, each of the definitions in FIG. 3, including Element Type 302, Binary Relationship Type 304, Attribute Type 314, and Element Type Group 318, are stored as objects within Element Repository 220. Element Repository provides a permanent, recoverable definition object stored in persistent storage (e.g., on disk) for each of these entities.

Figure 4:
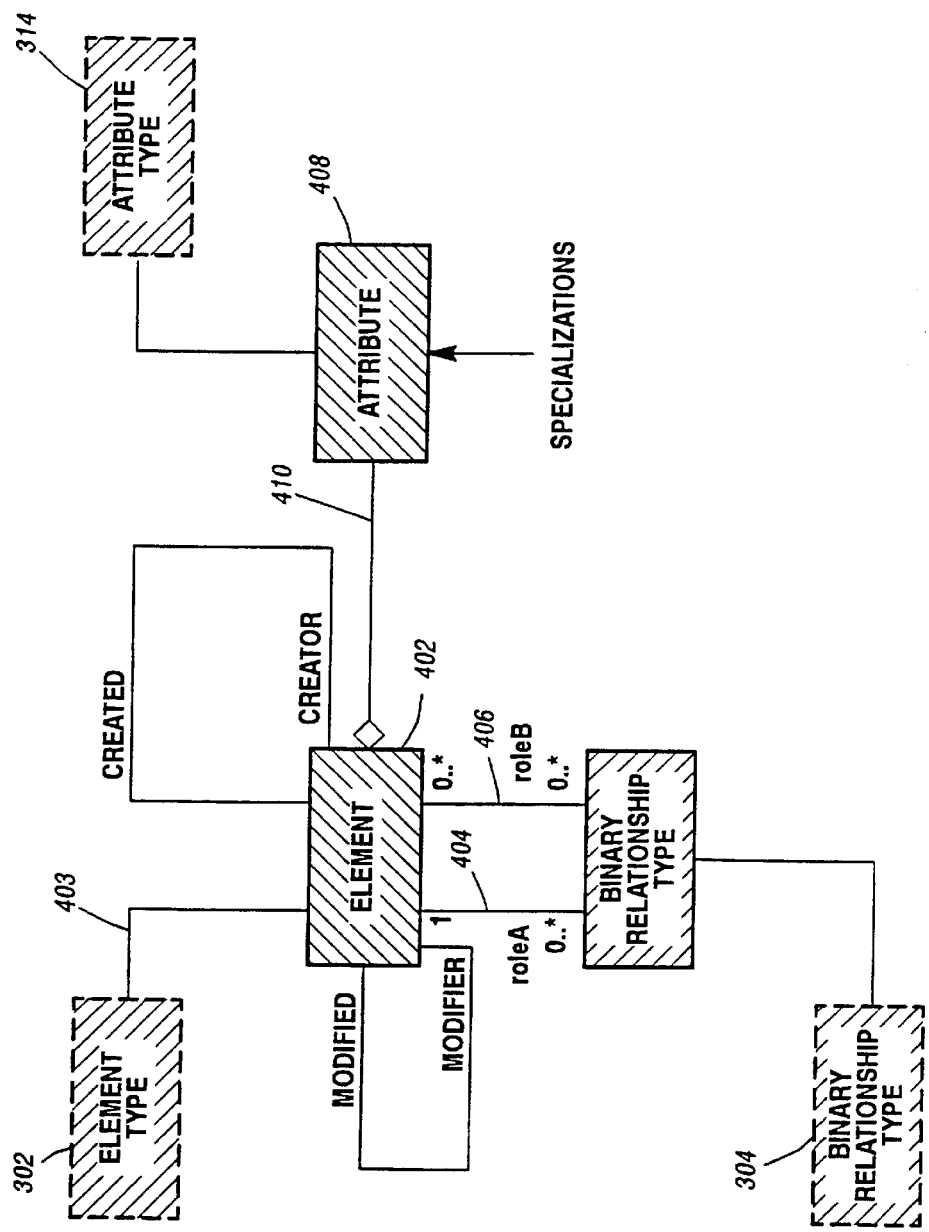
FIG. 4 is a block diagram showing the relationship between instances of elements and relationships, and the various type definitions provided in the model stored in the Element Inventory Schema.

FIG. 4 is a block diagram showing the relationship between instances of elements and instances of relationships, and the various type definitions provided in the model stored in the Element Inventory Schema. When an element, shown as Element 402, is created or loaded within Element Inventory 102, it is assigned to one of the predefined Element Types 302, as indicated by Line 403. Element 402 may be said to be an instance of that particular Element Type. By virtue of this association, Element 402 acquires the potential to be related to other defined element types according to each predefined Binary Relationship Type 304 that is defined for the Element Type 302, as is shown by Lines 404 and 406. Element 402 also may become associated with an Attribute 408 that is an instance of Attribute Type 314 defined for Element Type 302, as is represented by Line 410.

Element 402 and Attribute 408 are versioned objects, meaning that different versions of these elements may reside within the Element Inventory 102 at a given time. For example, if two versions of a code entity exist, two different versions of the associated element will exist. These two versions may or may not have relationships with different versions of a different element, depending on the interrelationships existing between the code entities within the system. For example, an updated version of a program will be associated with a later element version, which may or may not have the same relationships as the earlier element version. If the updated program version must reference an updated version of a table, for example, the table will further be described by meta-data in a later version of an associated element, and a relationship will be created between these two later versions of elements.

As discussed above and shown in FIG. 4, binary relationships are created between two elements. One manner of representing relationships between elements is by including pointers to the various related elements within the meta-data stored within an element. That is, the element stores a relationship indicator such as a pointer that may be used to address a respectively related element. Those skilled in the art will recognize that many ways of representing the element relationships exist, such as by storing name indicators identifying the various related elements.

Figure 5:
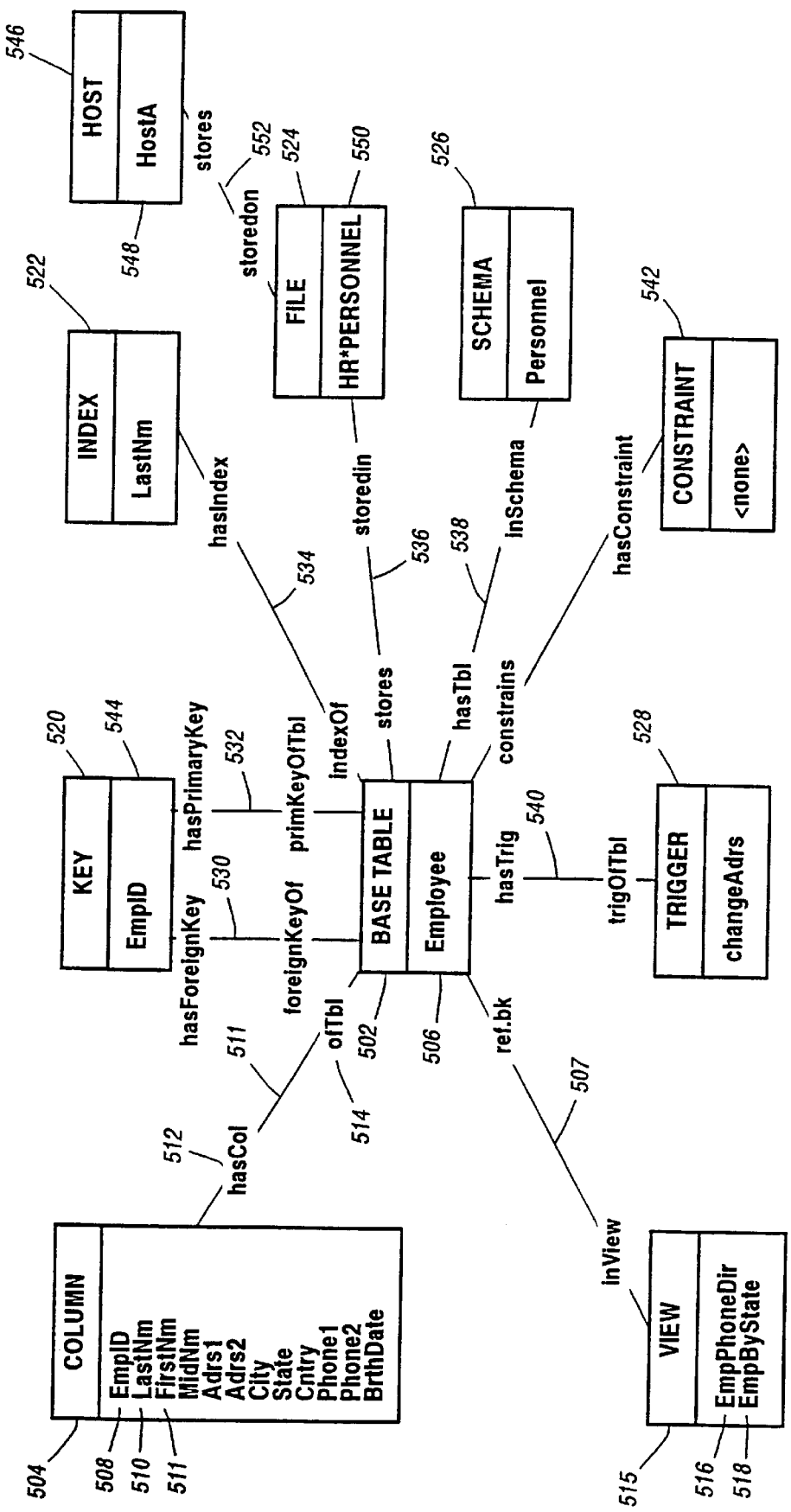
FIG. 5 is a block diagram showing an example of using the element model to define Asset Elements.

FIG. 5 is a block diagram showing an example of using the element model to define Asset Elements. In this diagram, Asset Element types are listed at the top of each block, and the name of element instances is represented below the element type. For example, this block diagram assumes an Asset Element type of "BaseTable" 502 is defined in EIS 103. This element type has a Binary Relationship Type with the Asset Element type "Column" 504. This represents the fact that a software component which is a table (and which is represented by an element of element type "BaseTable") has (at least one) column. As stated above, the relationships between elements represent relationships between the components described by the elements.

FIG. 5 further depicts that an instance of element type "BaseTable" 502 exists called "Employee" 506. This element is a construct that stores data that describes the actual software module with which it is associated, which in this example is a table. That is, this element represents an actual table of data which exists elsewhere on the system, for example, on Host A 228. This element is assigned the element type of "BaseTable", and is also given a name representing the function provided by the table, which in this case is "Employee". The element further stores an indication of all other elements to which it is related. This actual table may include columns containing information about employees of a business. This is represented by the fact that element "Employee" is related to elements of type "Column" 504 that include elements "EmpID" 508, "LastNm" 510, and the like. These column elements are related to element "Table" through the Binary Relationship Type represent by Line 511, and described by roleA 404 and roleB 406 of "hasCol" 512 and "ofTbl" 514. This represents the relationship between the actual table component, and the individual column components that comprise the table. (For the sake of brevity, instances of binary relationships will be discussed from this point forward in terms of either roleA 404 or roleB 406, but not both.) Element type "BaseTable" is shown having various other predefined relationships to other element types include element type "View" 515. Two instances of element type "View" 515 shown as "EmPhoneDir" 516 and "EmpByState" 518 are shown to exist, each having a relationship with element "Employee" 506 represented by Line 507. Other element types related to element type "BaseTable" include "Key" 520, "Index" 522, "File" 524, "Schema" 526, and "Trigger" 528, all of which have Element instances created and stored in the Element Inventory 102 which are related to element Employee 506, as is represented by Lines 530 and 532, 534, 536, 538, and 540, respectively. It may be noted that element type "Constraint" 542 is related to element type "BaseTable". However, for the particular element instance "Employee" of element type "BaseTable", no element instance of type "Constraint" 542 has been created. This demonstrates that the element and relationship type definitions within EIS 103 define potential, not mandatory, relationships which may or may not be established for a given element instance. It may further be noted that more than one type of relationship can be established between an element of a given element type and another element of a second element type. For example, element "Employee" 506 of element type "BaseTable" 502 is capable of establishing the two different types of relationships represented by Lines 530 and 532 with element "EmpID" 544 of element type "Key" 520.

Attributes 408 of a predetermined Attribute Type 314 may be attached to each of the Elements. For example, assume the element type "Column" is related to an attribute type of "DataType" describing the data type of the column data. For a created element instance of element type "Column", meta-data may be stored within the element to describe the data stored within the associated data module containing the column data, and may indicate that data is of type string, long integer, short integer, or character, for example.

For any of the Asset Elements, information is also stored that describes the location of the associated code, data or system component. This information does not necessarily have to be stored within each of the elements, but need only be stored within one of the elements within a group of elements. This can best be understood by returning to the current example.

As noted above, it will be assumed element "Employee" 506 represents, and contains meta-data associated with, an actual table existing on one of the servers or host systems associated with the Object Management System 100. Assume this table resides on Host A 228 of FIG. 2. Somehow the location of this table must be recorded within the Element Inventory. This can be done by recording the information directly in each element associated with the table. For example, the server name, directory path, and any other location information could be recorded within element "Employee" 506, and further within all other elements describing the table data, including each and every Column Element shown in FIG. 5. This approach results in duplication of a large amount of data, since multiple elements store the same location information. This data duplication means that more space is required to implement Element Inventory 102, and also means that a change in location of a given code or data module requires changes to many elements. Instead of storing location information in every element, in the preferred embodiment, the location of the table is only recorded once. This location is stored in a separate element having a dedicated element type. In the current example, this element type is called "Host" 546. An instance of this element type called "Host A" 548 is shown connected to element "HR*PERSONNEL" 550 via a relationship represented by Line 552. Element "Host A" 548 will include the server name and directory path for the file "HR*PERSONNEL" located on Host A 228. Further assume that the relationship represented by Line 536 indicates that the file "HR*PERSONNEL" stores a table represented by element "Employee" 506. Because the location of the file is known, by implication the location of the included table is also known, and can be determined by traversing element relationships stored within Element Inventory 102 to find the element of type "Host" 546.

The example of FIG. 5 helps illustrate the modeling approach. A model is stored within the EIS 103 describing potential relationships and attributes for a defined element type. For each element type, element instances may be created having only some, or all, of the predefined relationships. An element instance may have a selectable multiple number of relationships of a given type. For example, BaseTable "Employee" 506 has multiple relationships of the type "hasCol", each with an instance of element type "Column" 504.

At this point, it will be recognized by one skilled in the art that an object management system for managing code and data components could be constructed without the use of a model to define the various elements. For example, the definition of each of the element structures could be stored within the associated element itself without having a separate element definition provided by the model. However, the use of a model makes many of the tasks associated with managing objects easier. For example, often it is desirable to locate all elements that are somehow related to a particular target element of interest. As discussed above, this could be necessary if an entire application is to be ported to a new environment. To facilitate this task, every relationship associated with the target element must somehow be recorded so that it may be traversed. If the definitions for these relationships are recorded within the element themselves instead of within a model, the various tools used to search, manage, create, and modify elements must include hard-coded information about each Element Type. If a model is used, however, these element management routines may use the model as a map to traverse the relationships within the Element Inventory 102, and to further create and/or modify elements, and no special knowledge about element type definitions need be incorporated within the actual management tools.

The use of the model in searching the Element Inventory 102 is best shown by example. Assume the model for element type "BaseTable" is stored in the Element Inventory Schema 103. A particular named element within the Element Inventory may be known or is otherwise located. The associated element type for the known element is used to access the element type definition within the model. The model indicates that the subject element type is associated with one or more Binary Relationship Types. For each of these Binary Relationships Types, the meta-data stored within the element is analyzed to determine if any instance of these Binary Relationship Types exists for the particular element instance. If an instance of any of these Binary Relationship Types exists for the element instance, the Binary Relationship instance may be traversed to locate a related element. This process can be made recursive such that each of the identified elements is made the target of the search, and all related elements associated with the target are further identified. Using this method, the element relationships can be traversed to find all elements that are either directly, or indirectly, related to the target element. All relationship traversal is performed using the model definition. This model-based method is particularly useful because it can accommodate the situation wherein new element type definitions are added to the Element Inventory Schema 103, or wherein element type definitions are modified. This modification of element definitions can be accomplished without modifying any of the element management tools.

As mentioned above, searching of the Element Inventory may be performed to identify related elements for the purpose of migrating the associated code and data components to a new platform. However, other uses exist for traversing relationships. For example, before a code entity is modified, it may be desirable to assess the possible impact the changes will have on other code or data entities. This impact analysis can utilize the model stored in the EIS to traverse element relationships so that code and/or data components related to the component that will change may be located and evaluated. Further modifications may then be made to related component, if necessary, so that compatibility is maintained. This type of analysis can also be made when a component is deleted.

Defining an Element Package

Many reasons may exist for grouping elements together into an Element Package. Generally, an Element Package will comprise elements that represent, and model, all code and data modules that are needed to perform one or more predetermined functions. Once the member code and data modules have been so grouped, they can be operated on, for example, to make them compliant with Year 2000 requirements. Alternatively, the member code and data modules can be transformed into a different software language and/or ported to another platform. The Element Package can also be used to define and model the external interfaces provided by the member code and data modules. This provides an abstraction that, in affect, hides the inner relationships between the included code and data modules, and only exposes the interfaces that will be needed to call that group of code and data modules. Using the interface definition provided by an Element Package, "wrapper" code can be developed that translates the Element Package interface defined by the member elements to a different interface technology. That is, the wrapper provides an interface that allows the member code and data modules to be accessed from an environment other than the one in which the member modules operate.

Element packages can also be used to perform impact analysis. Before a code or data module modeled by an element is modified, it may be determined if that element is member of one or more Element Packages. This may be accomplished by determining whether the element in question has any relationships to an element of element type "Element Package", as will be discussed below. This is performed using the various Element Viewers 144 and other analysis tools provided by Object Management System 100 to be discussed below. Once it is determined that an element is included in an Element Package, the impact of a potential change on the predetermined function(s) represented by the Element Package may be assessed so that other changes can be made to maintain compatibility between the member elements and Element Packages.

The first step in defining an Element Package is selecting an initial set of elements that will comprise the nucleus of the package. One tool that aids the user in this task is the Element Locator 124, which provides the user with the capability to identify all elements associated with one or more specified concepts. The user may then select one or more of the identified elements as the starting point for building an Element Package. For example, a user may be developing new software that could make use of one or more existing functions. For illustration purposes, assume that the functions are related to payroll tasks. The user can search the Element Inventory for any Asset Elements associated with the concept "payroll". The user may then further refine the search results by applying additional search criteria so that a subset of elements is located that is relevant to the new software being developed. The Element Locator 124 is described in the co-pending applications entitled "System and Method for Developing a Selectably-Expandable Concept-Based Search", and "An Object Management System Supporting the Use of Application Domain Knowledge Mapped to Technology Domain Knowledge" referenced above.

Another tool provided to locate a particular set of elements to form the starting point for creation of an Element Package is the Element Viewers 144. This tool provides several graphical interfaces to display the information stored within Element Inventory 102 and the EIS 103.

Figure 6:
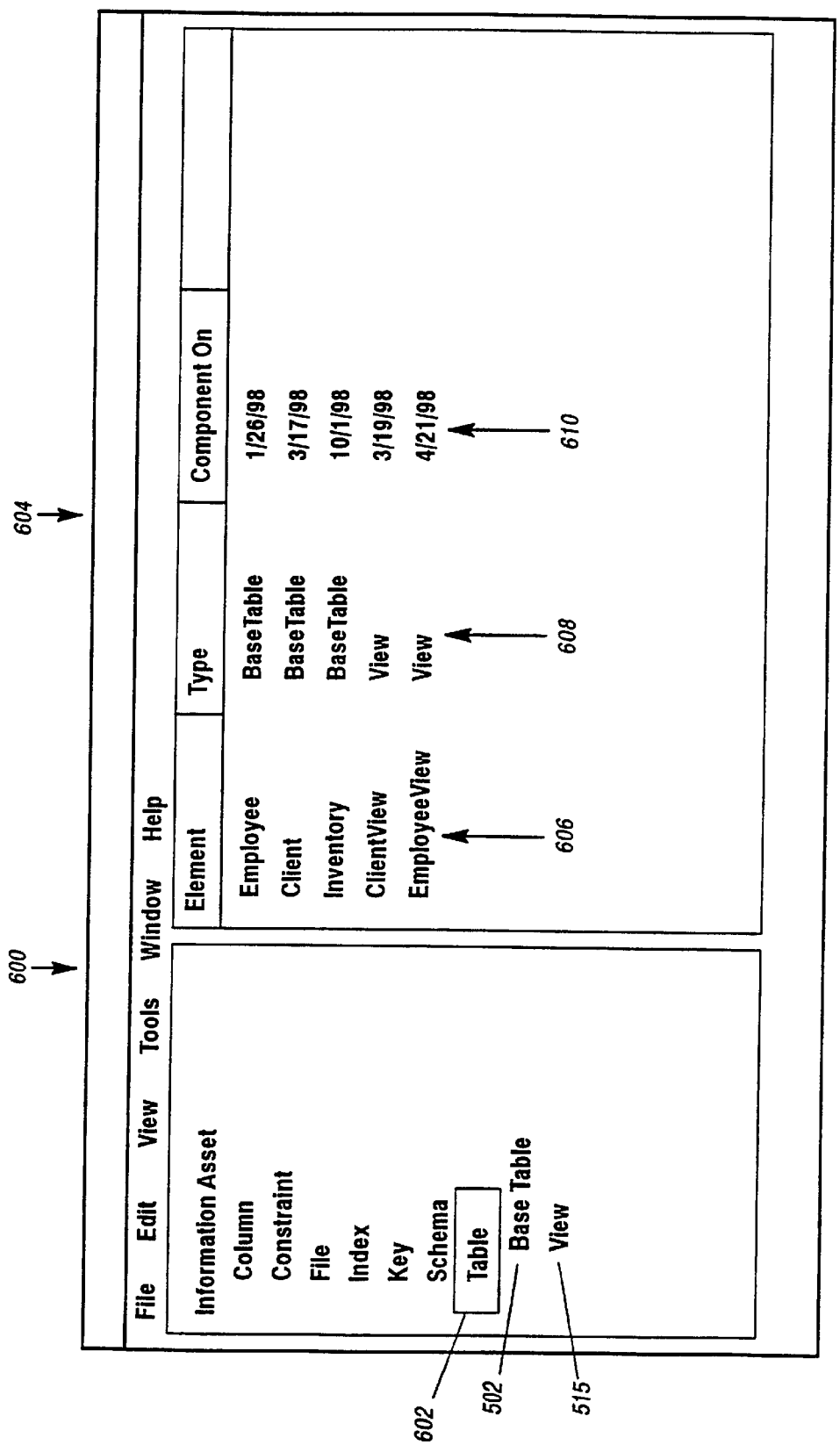
FIG. 6 is an illustration of the user interface for Element Explorer View provided by Element Viewers.

FIG. 6 is an illustration of the user interface for Element Explorer View provided by Element Viewers 144. The left-hand display window 600 provides the user with a list of element types defined within the EIS 103. This list is obtained by making a service call such as "Get Element Types" to the AIM DLL. Block 602 shows the element type "Table" being selected by the user. The other element types shown in FIG. 5 such as Column 504 are also shown in the left-hand display window of FIG. 6. Within Object Management System 100, hundreds or even thousands of element types may be defined. Window 600 also shows the element type hierarchy, with each element type having the ability to include one or more element subtypes below it in the hierarchy, which are illustrated in an indented format. In FIG. 6, element type "Table" 602 is shown including the element subtypes "BaseTable" 502 and "View" 515, which appear indented below it in the display.

Once a particular element type is selected, the list of elements of this type stored within Element Inventory 102 are shown in the right-hand display Window 604. Element creation and modification audit attributes such as the date an element is created may also be displayed in this Window. In this example, all of the Elements stored in Element Inventory 102 that are either element type "Table", or are a subtype of element type "Table" are shown listed in Column 606. These element names listed in Column 606 uniquely identify a particular element, and may be used to select the starting elements that will form the basis of an Element Package. In this instance, the user may use this list to identify the element name "Employee", assuming the user did not already know the name of this element.

In addition to the element name, the corresponding element type is listed in Column 608. In this example, the three elements displayed in Column 606 are each of the element type "BaseTable", which is a subtype of element "Table". Column 610 shows the audit attribute information for the selected elements.

Other methods of identifying a starting set of Asset Elements could likewise be used. For example, a separate index of application concepts could be referenced to locate a list of Asset Elements that may be related to the specified application.

After a user has identified one or more elements as the starting point for the Element Package, the user must somehow gain visibility into all of the relationship dependencies that exist for each of the initially-identified elements. This must be done so that the user can identify which other elements must also be included within the Element Package to represent a functionally complete group of code and data modules for the desired application function. The relationships existing between the elements can best be discussed by re-examining FIG. 5. As described above, FIG. 5 shows all of the relationships existing for a particular instance of element type "BaseTable" 502 wherein the element instance is named "Employee". This is the type of graphical display provided by the Relationship View included in the Element Viewers 144 of FIG. 1. This view is obtained by specifying a particular element name, in this case "Employee", as the selected element. Using this view with element "Employee" 506 identified as the selected element, all relationships associated with this selected element are shown as Lines 507, 511, and 530–540. The elements associated with element "Employee" 506 are shown on the periphery of the display interconnected to Lines 507, 511, and 530–540.

Although the Relationship View is useful in allowing a user to view relationships associated with a selected element, it is not as useful in providing insight into the manner in which a large number of elements inter-relate. This is the type of information needed to build a package of elements representing a target group of data and code modules. As such, the Element Packager 118 is provided to aid the user in understanding complex interrelationships between relevant elements that represent code and data modules. The Element Package 118 further allows a user to selectively add and delete elements from an Element Package until all code and data modules that are necessary and sufficient to a particular application have been represented within the Element Package in a manner which is described in the following examples.

Element Packager Operation

Element Packager 118 requires as input parameters one or more Asset Elements that provide the foundation for constructing the Element Package. Element Packager then provides a display of all elements having relationships to the initially-specified elements. This display is obtained by first making a "Get Element" service call to the AIM DLL with the names of the initially-specified elements, for example, element "Employee". This causes the information for these elements to be provided to Element Packager 118. The Element Packager retrieves the relationship data from these structures. In the preferred embodiment, the relationship data is stored in the UREP fully object-oriented Element Repository 220 as pointer data between elements, and is returned to the user described as relationships. The relationship data is retrieved from Element Repository 220 and provided to a requesting tool such as Element Viewers 144 after a service call such as "Get Element" or "Get Element for Update" which returns a requested element structure, along with the relationship data stored therein.

Figure 7:
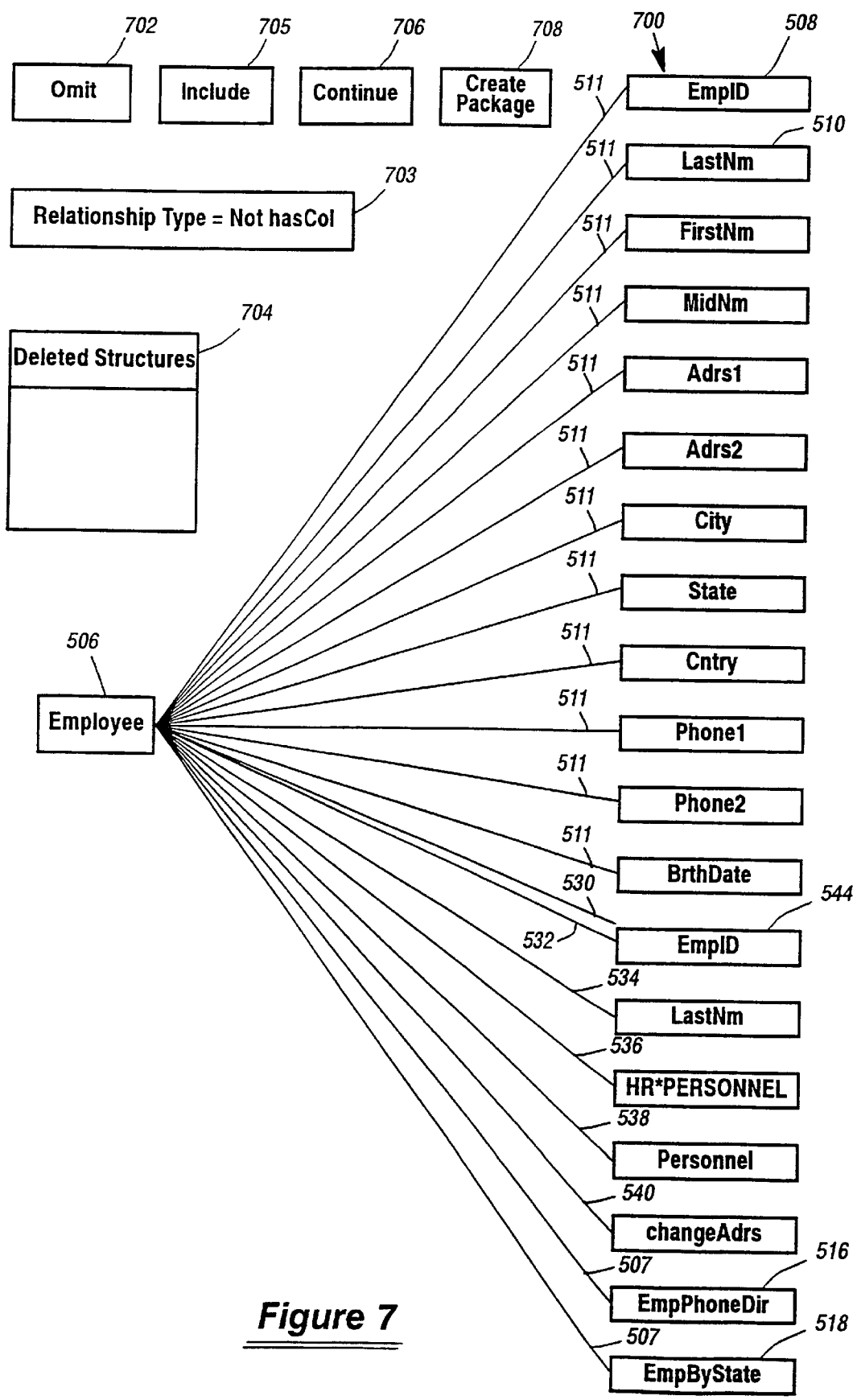
FIG. 7 is an exemplary screen display provided by Element Packager when the initially-specified element list includes the single element "Employee" of FIG. 5.

FIG. 7 is an exemplary screen display provided by Element Packager 118 when the initially-specified element list includes only the single element "Employee" 506 of FIG. 5. This element is shown on the left, and all related elements are shown in Column 700 on the right. Lines 507, 511, and 530–540, depicting the element relationships shown in FIG. 5, are shown interconnecting the various Elements in Column 700 to element "Employee" 506. In the preferred embodiment, the display can provide an indication of element types, attribute types, and relationship types. For example, the user may select one of the relationships shown as Lines 511, and Window 703 will indicate the relationship type is "hasCol". Alternatively, the user may select an element, and Window 703 will indicate an element type, and all attributes associated with the element.

After Element Packager provides the graphical display of related elements as shown in FIG. 7, the user is allowed to remove elements from the list. It may be remembered that the purpose of this exercise is to obtain a list of only those elements that represent code and data modules that will be needed in this example by the new software being developed. This can be done by manually selecting a relationship, then hitting the Omit Button 702. Alternatively, omitting elements from a package may be accomplished semi-automatically by specify a filtering function.

In the preferred embodiment, a filter function is specified as either a relationship type, or as an attribute that is associated with one of the elements. This filter function can either be specified as an inclusive filter, or as an exclusive filter. For example, the user may choose an inclusive filter which specifies that the list of related elements will only include those related elements having a relationship of the type represented by the binary relationship "hasCol" 512 and "ofTbl" 514, and which is represented by Line 511 of FIG. 5. The syntax of this filter could include Boolean operators, and would be similar to the following:

"Include RelationshipType=hasCol OR ofTbl"

This filter would result in a display wherein only those elements related to the initially-specified elements via a relationship of type "hasCol" or "ofTbl" are shown in Column 700.

The user may also specify that only elements having a particular element attribute, for example, "ElementAttribute Data Type=String" will be included within the related element list.

A filter may include both relationship and attribute specifications as follows:

"RelationshipType=hasCol AND ElementAttribute Data Type=String"

This filter would result in a display wherein only those elements related to the initially-specified elements via a relationship of type "hasCol" and also having the element attribute of "String" are shown in Column 700.

Alternatively, the user may specify an exclusive filter whereby the related element list will not include those elements related according to the relationship of the type represented by Line 511. For example, "RelationshipType=NOT hasCol".

It will be understood that the types of filters mentioned above are merely exemplary in nature, and many other logical combinations could be constructed.

After the user specifies a filter and hits an "Enter" key, the list in Column 700 will be automatically adjusted to contain only the selected elements. Any omitted elements are removed from Column 700, and displayed in Window 704. Following this step, the user may re-add any omitted element by selecting the element from Window 704 and hitting "Include" Button 705, or may further manually delete elements in the manner discussed above. A subsequent filtering function may also be defined.

Returning to the current example, assume the user knows that most columns in BaseTable "Employee" will not have to be used by the new code associated with the payroll function. Therefor, the user performs a filtering operation that omits all elements related to element "Employee" 506 having the relationship of the type "hasCol" represented by Lines 511. This filtering specification is shown entered in Window 703. This will result in the omission of all elements of type "Column" 504 from the list. However, the user knows that elements "EmpID" 508, "LastNm" 510, and "FirstNm" 550 are needed to perform the new function. These elements may be manually added back to the list by selecting them in Window 704, and using "Include" Button 705. Additionally, assume the user knows that only one of the elements of element type "View", that being element "EmpByState" 518, must be included in the package to accomplish the task. The user may further delete element "EmpPhoneDir" 516 from the element list by selecting that element, then using Omit Button 702.

The resulting element list contained in Column 700 includes only elements that are somehow related to the initially-selected element(s). In this case, the initially-specified element is "Employee" 506, representing a table that will be reused by the newly-created code of this example.

Figure 8:
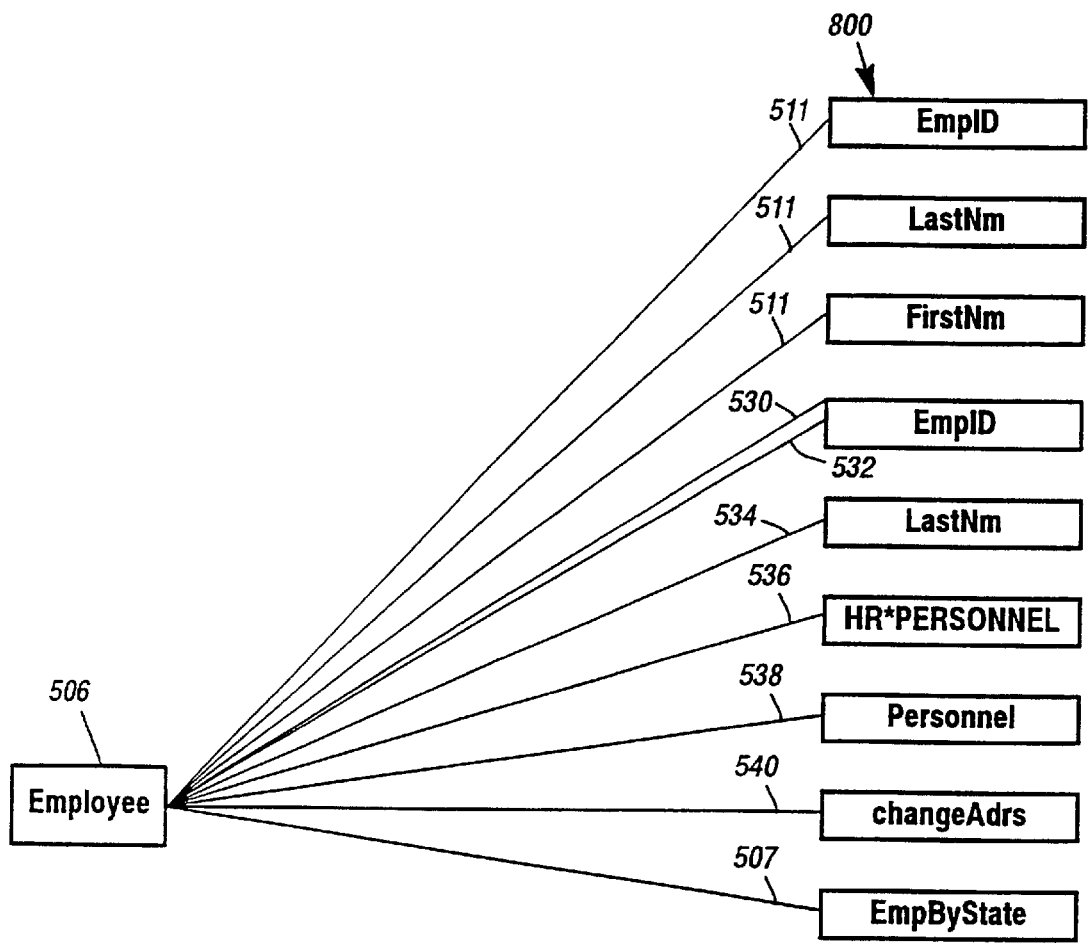
FIG. 8 is a block diagram showing element relationships for element "Employee" after an automatic filtering function and several manual adjustments have been performed to the related element list according to the example described above.

FIG. 8 is a block diagram showing element relationships for element "Employee" after an automatic filtering function and several manual adjustments have been performed to the related element list according to the example described above.

After the user has obtained the complete set of related elements and element relationships for the initially-selected element(s), the process is repeated. That is, the user is able to select the "Continue Button" 706 so that the process is repeated for the elements remaining in Column 800. As a result, all elements related to the elements in Column 800 are retrieved from the Element Inventory 102 via calls to services in the AIM EXE in the manner discussed above.

The newly-retrieved elements are displayed in an additional column, and according to the preferred embodiment, will be filtered automatically to exclude any specific element relationships already shown in the display. For example, the element "Employee" 506 will not be shown in a column to the right of Column 800 in FIG. 8, since the relationships with element Employee for each of the elements in Column 800 have already been accounted for, and are shown as the Lines 507, 511, and 530–540. The user may edit this most-recently obtained list in the manner discussed above, using either manual adjustment or using filtering.

The process of locating another element set, then editing the set to include only those elements needed in the Element Package may be repeated any number of times until a complete element set is obtained. The element set will be complete when an iteration in the process produces a list of newly-selected elements that are unnecessary for implementation of the desired function. That is, the list contains only elements that will be removed by the user. When the complete set of elements is obtained, the user selects the "Create Package" Button 708, and Element Packager 118 will create an element representing the Element Package, as will be discussed below.

Figure 9:
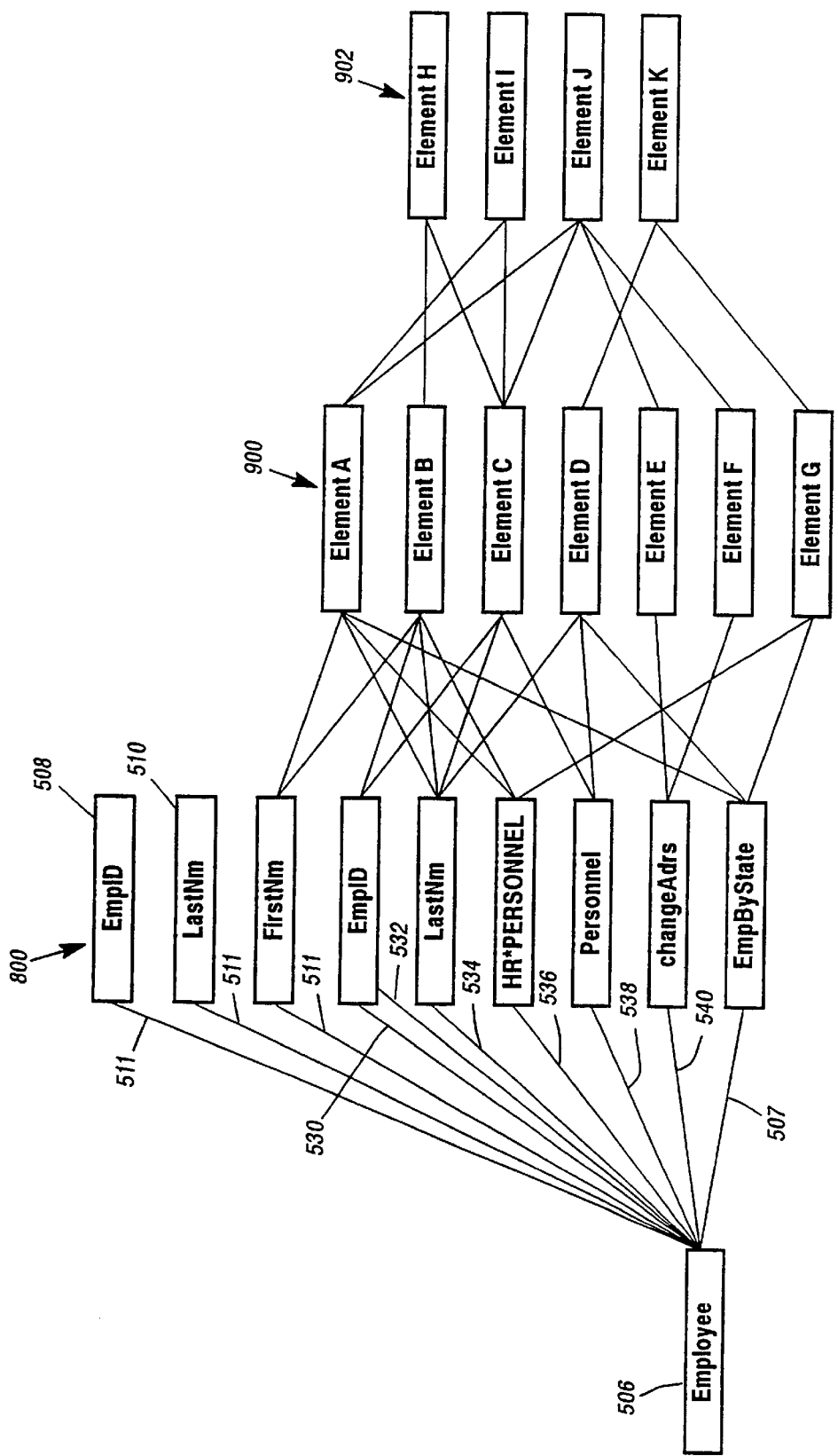
FIG. 9 is a block diagram representing an exemplary chain of related elements that are associated with code and/or data modules that can be utilized as a complete unit.

FIG. 9 is a block diagram representing an exemplary chain of related elements that are associated with code and/or data modules that can be utilized as a complete unit. FIG. 9 shows the manner in which the elements from Column 800 from FIG. 8 are related to other elements shown in column 900. It may be noted that for some elements such as "EmpID" 508 and "LastNm" 510, no other related elements need to be included in the package. These elements are therefor not related to any other elements shown in Column 900. Further, it may be noted that more than one element may be related to a given element in Column 900. The list of necessary elements for this particular package is further expanded to include those in Column 902. The block diagram of FIG. 9 is merely exemplary in nature, and it will be understood that many more columns could be included in the final Element Package representation. Each column, including the first and last columns, may contain one or more elements.

Figure 10:
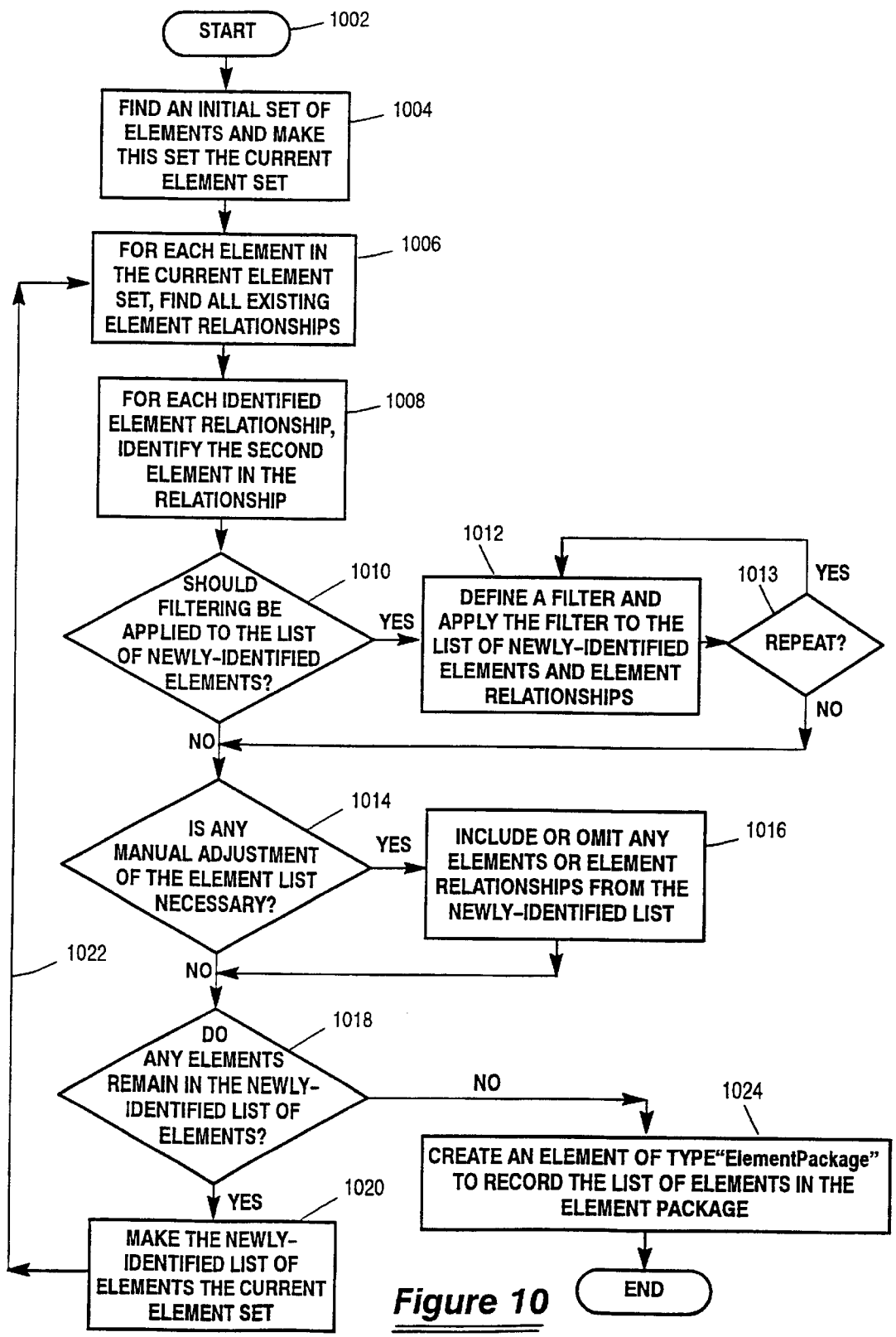
FIG. 10 is a flowchart of the iterative process used to traverse element relationships to define an Element Package.

FIG. 10 is a flowchart of the iterative process used to traverse element relationships to obtain a defined Element Package. From Start Block 1002, an initial set of one or more elements must be identified, as shown by Step 1004. This could be done using a variety of tools including Element Viewers 144 and Element Locator 124, as discussed above. Once this initial element set is defined, each of the elements in the set is read from the Element Inventory 102 using service "Get Element" described above. For each element, all element relationships are identified using the relationship data included in the element structure as shown in Step 1006. In the preferred embodiment, this is accomplished by reading, for each element identified in Step 1004, the element type definition from the EIS 103, then using this element type definition to match a relationship instance stored in an element instance with a relationship type. Next, each of the identified relationships is used to retrieve the other element participating in the binary relationship using a "Get Element" service call. This is represented by Step 1008. It may be noted that the steps shown as Steps 1006 and 1008 could be combined if desired such that as each element relationship is identified, the second element in the relationship is also identified.

After the set of all related elements and element relationships have been identified for the current element set, filtering may be applied if desired, as shown by Decision Step 1010. If filtering is applied, elements may be omitted from, or included in, the list of newly-identified elements, as shown by Step 1012. Steps 1010 and 1012 may be repeated if desired so that multiple filters are applied to the element list, as indicated by Step 1013. Next, manual adjustment of the list may be performed, as indicated by Decision Step 1014. If manual adjustment is performed, elements may be manually omitted from and/or included in the newly-identified element list as shown in Step 1016. Of course, Steps 1010 and 1014 could be performed in reverse order, or could be performed multiple times, if desired, as discussed above. If any elements remain in the list of newly-identified elements after the filtering and manual adjustment steps are performed, the newly-identified element list is made the current set of elements as shown by Decision Step 1018 and Step 1020, respectively. Then the process is repeated, as shown by arrow 1022. If no elements remain after the filtering and manual adjustment steps, the complete list has been identified. The list of all identified elements and element relationships during all iterations of the process, excluding those that have been removed by filtering or manual adjustment steps, will comprise the Element Package. Element Packager therefore creates a special element type of "Element Package" to record the contents of the package, as shown in Step 1024. Elements of type "Element Package" are discussed below.

It may be noted that the above-described process is exemplary, and modifications to this process may be made without changing the functionality provided. For example, all newly-identified elements may be retained during each iteration, with any filtering and adjustment steps being performed at the end. Alternatively, the filtering and adjustment steps could be by-passed altogether, although the user would have less control over the process.

As discussed above, the preferred embodiment uses a model-based object management system. This means that all element type definitions are stored in Element Inventory Scheme 103. The element type definitions are used in the steps shown as Steps 1006 and 1008 of FIG. 10 to locate the existing element relationships and related elements for any given identified element. It may be noted that elements could be stored and managed without the use of the model for defining element types. That is, the element structure could be self-defining. However, the various tools such as Element Viewers 144 and Affinity Analyzer would have to take into account the various element structures. Using the model, these tools may operate completely independently of the element definitions.

The use of the model in searching the Element Inventory 102 is best shown by example. Assume the model storing an element type definition for each element type is stored in the Element Inventory Schema 103. A particular named element, for example, element "Employee" is retrieved from the Element Inventory. This can be accomplished using the "Get Element" AIM DLL service discussed above. Next, the associated element type as indicated by the element data is retrieved from the EIS 103 using the "Get Element Types" AIM DLL service. This element type definition, which in the current example is the definition for element type "BaseTable", defines the various potential Binary Relationship Types that exist for this element. For each of these Binary Relationships Types, the metadata stored within the element is analyzed to determine if any instance of these Binary Relationship Types exists for the particular element instance. This can be done by matching relationship indicator data stored in the element instance with a particular relationship type definition stored in the element type definition.

Returning to the current example, the meta-data for element "Employee" will indicate the presence of multiple relationships with elements of type "Column" 504 as shown in FIG. 5. The meta-data will further indicate that no relationships exist with elements of type "Constraint" 542, even though such relationships are possible. If an instance of any of these Binary Relationship Types exists for an element instance, the meta-data representing the binary relationships can be utilized to locate the other related elements.

If desired, this process can be made recursive such that each of the identified elements is made the target of the search, and all related elements associated with the target are further identified. Using this method, the element relationships can be traversed to find all elements that are either directly, or indirectly, related to an initially-identified element. All relationship traversal is performed using the model definition. This model-based method is particularly useful because it can accommodate the situation wherein new element type definitions are added to the Element Inventory Schema 103, or wherein element type definitions are modified. This modification of element definitions can be accomplished without modifying any of the element management tools.

Figure 11:
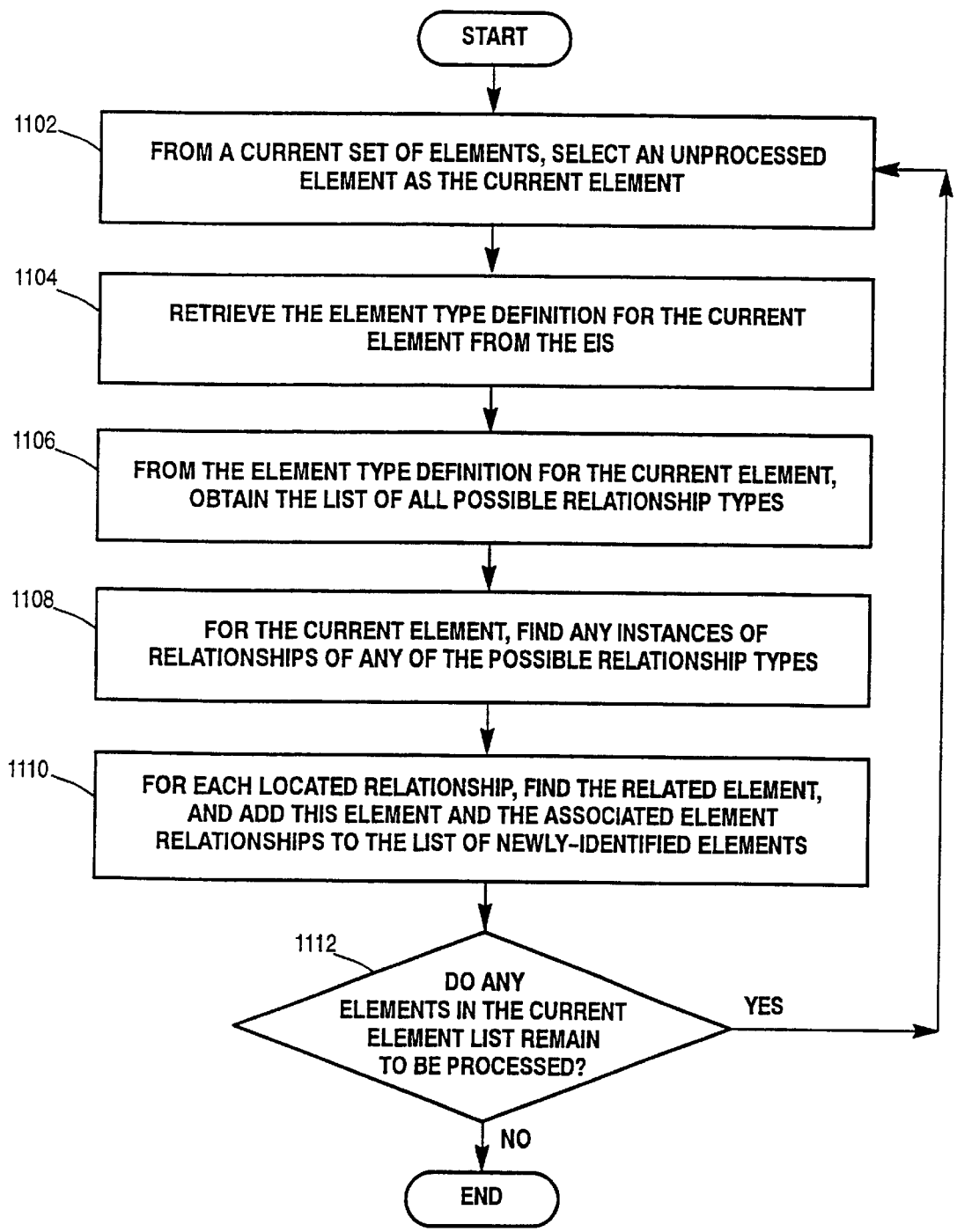
FIG. 11 is a flowchart of one embodiment of the invention utilizing a model in the manner discussed above to locate element relationships, and to locate elements related to a specified element.

FIG. 11 is a flowchart of one embodiment of the invention utilizing a model in the manner discussed above to locate element relationships, and to locate elements related to a specified element. This algorithm is used by Element Packager 118 of the preferred embodiment, although, as stated above, the use of the model is not necessary to practice the inventive concept. The steps shown in FIG. 11 may be utilized as the process to accomplish Steps 1006 and 1008 of FIG. 10, which may be combined in the manner discussed above. As shown in FIG. 11, an unprocessed element is selected from the Current Set of elements, as shown in Step 1102. The meta-data for the current element may be obtained from the Element Inventory 102 using a call to the AIM EXE service "Get Element". From the element data, Element Packager 118 then locates the element type definition for the located element from the EIS 103, as illustrated in Step 1104. In the preferred embodiment, this could be performed using a call to the AIM EXE service "Get Element Type", which returns a specified element type definition as an output parameter. From this element type definition, the various potential relationship types for this element type are identified, as shown in Step 1106. For each of these relationship types, information from the current element is analyzed to determine if any instances of these potential relationship types exist, as listed in Step 1108. This determination is made using a relationship type indicator stored with each relationship instance, wherein the relationship type indicator associates a relationship type from the EIS to the relationship instance. Each relationship instance is analyzed to locate the associated element, and any newly-located element is added to the list of newly-identified elements. This is shown in step 1110. If any unprocessed elements remain in the list, this process is repeated, as represented by Decision Step 1112.

Creating and Storing Element Package Definitions

As discussed above in reference to FIG. 3, the preferred embodiment of Object Management System 100 utilizes three categories of element type, including the Asset Element Type Group, the Locator Element Type Group, and the System Element Type Group. A detailed discussion of Locator and System Element Types is beyond the scope of this invention. All of the elements shown and discussed in reference to FIGS. 5–11 above are subtypes of the element type "Asset Element". These elements are included in the element type hierarchical tree below the broad characterization "Asset Element" Another element type that is a subtype of the element type "Asset Element" is called an "Element Package". This element type is used to express the Element Packages discussed above, and is capable of forming a relationship called "aggregation" with any other element type that is a discrete Asset Element Type. (As discussed above, discrete Asset Elements Types are those Asset Element Types for which elements actually exist within the Element Inventory 102, versus those Asset Element Types that are abstract, and created merely for categorization purposes.) The aggregation relationship indicates that all Asset Elements that are related to an element of type "Element Package" are the elements that are included within the Element Package.

Figure 12:
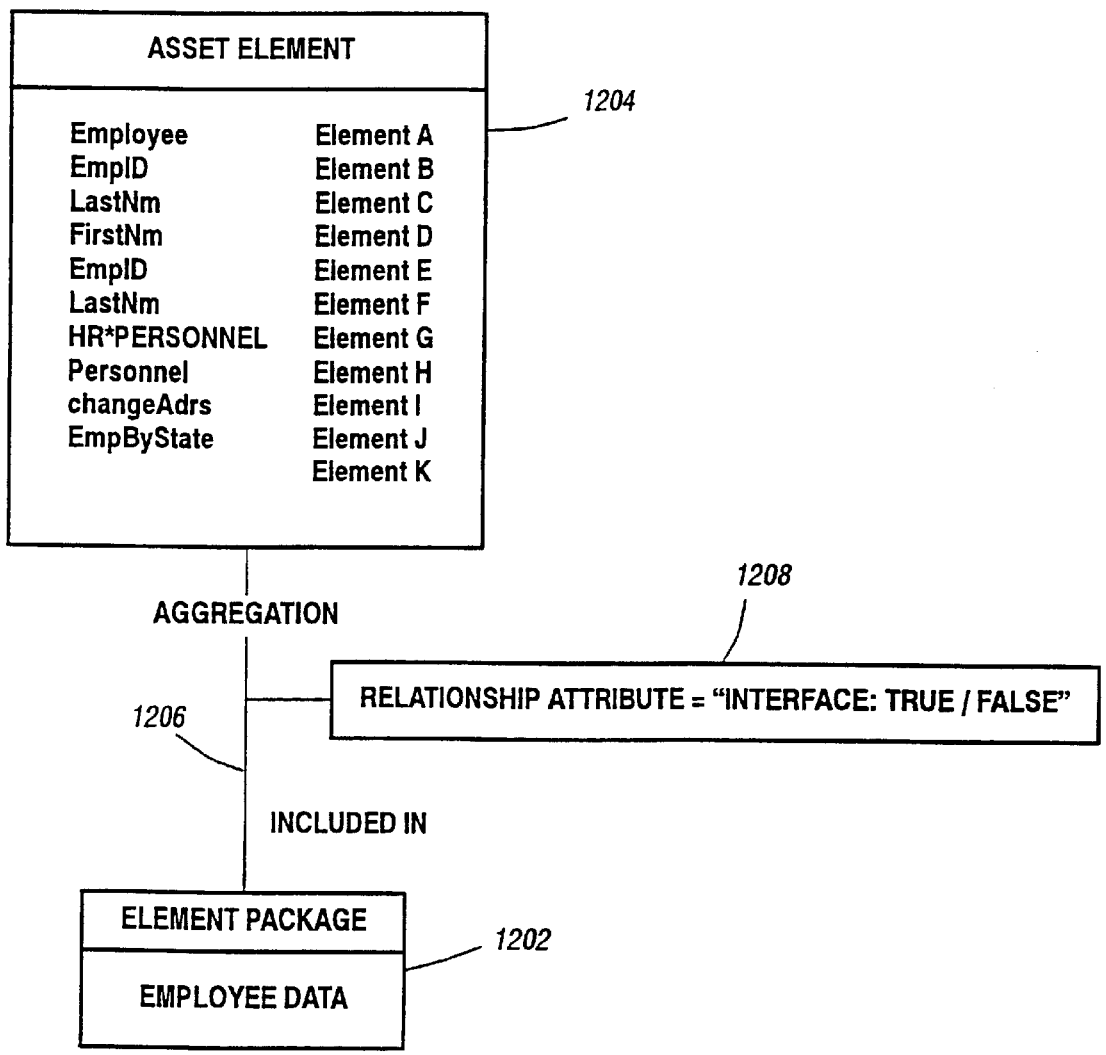
FIG. 12 is a graphical model of an element of type "Element Package" created using the elements shown in FIG. 9.

FIG. 12 is a graphical model of an element of type "Element Package" created using the elements shown in FIG. 9. This model is similar to that shown in FIG. 5 for element "Employee". This diagram indicates that an element type of "Element Package" is capable of forming a binary relationship of kind "aggregation" with any element of the type "Asset Element" that is a discrete element type. By virtue of inheritance involved in the element hierarchy described above, this element type is further capable of forming a binary relationship of type "aggregation" with any element that is a discrete subtype of "Asset Element". Thus, since all of the elements discussed above as representing either code or data elements are discrete Asset Elements, any of the elements shown in FIG. 10 can form a relationship of type "aggregation" with an element of type "Element Package".

In FIG. 12, a particular instance of element type "Element Package" is created called "EmployeeData" shown in Block 1202. This represents the Element Package created using the elements shown in FIG. 9. Element EmployeeData 1202 has a relationship of type "aggregation" with each of the Asset Elements from FIG. 9, which are shown listed in Block 1204. These relationships are represented by Line 1206. The relationships are implemented in a manner discussed above, using pointers between objects within the Element Repository 220. Those skilled in the art will recognize that still other means of implementing this package may be utilized, for example, by storing unique element identifiers within each element to indicate the related element structures.

Elements of element type "Element Package" are created by the Element Packager 118 when the user selects the "Create Package" Button 708 of FIG. 7. The element name is provided by the user in Window 703. Element Packager will read the element type definition for element type "Element Package" from the EIS using a "Get Element Type" service call. Using the retrieved definition, an instance of that element type is created in local memory having relationships of "aggregation" with the selected elements, and having a name selected by the user. Element Packager further creates an interface definition for the Element Package, wherein that interface definition is stored within the element structure. Interface definitions will be discussed further below. The newly-created element instance is written to Element Inventory 102 using the "Create Element" service call.

Element Packager 118 is responsible for generating attribute data at the time a new element of type "Element Package" is created. As discussed above, an attribute is data that may be associated with an element to describe the associated code or data module. In the preferred embodiment, element attributes are stored as string data in the associated element structure, and may include comments about the associated module, or may store other descriptive data. For example, a data-type attribute associated with an element of element type "Column" describes the type of data stored in the column of a table represented by the element.

Like elements themselves, relationships between elements may also be associated with an attribute. The attributes that are associated with relationships can be used to describe the relationships existing between the associated code and data modules represented by the related elements. In the case of Element Packages, a relationship attribute called "Interface" is assigned to each of the relationships of type "aggregation", as is shown in Box 1208 of FIG. 12. For each instance of an aggregation relationship, this attribute will either be designated as "True" or "False". If the Interface attribute for an aggregation relationship is set to "True", the related element is said to be "exposed" as part of the interface of the Element Package. Otherwise, if the Interface attribute for an aggregation relationship is set to "False", the related element is said to not be exposed, and is not included as part of the interface definition of the Element Package.

Before further discussing the manner in which interface attributes are used, interface definitions for Asset Elements are described. Any Asset Elements defining a code module may have a defined interface stored within the element that describes the interface for the associated code module. The interface will list one or more functions, and for each of the functions will list the input parameters required by the function, and the output parameters supplied by the completed function. An example interface specification may look like the following:

Function ID1 (Firstname:string, Lastname: string), Customer_Number: short integer)

Function ID2 (Firstname:string, Lastname: string), Credit_Card_Number: long integer).

This interface definition describes two functions performed by a code module associated with the element. Both identified functions include a list of input parameters shown listed between a left-most set of parenthesis. Following the input parameter list is a list of output parameters generated by the function. The above-described functions each require as input parameters strings that represent a first and last name designated as "Firstname" and "Lastname", respectively. The first function returns as an output parameter a customer number described as a short integer. The second function returns as a long integer a credit card number.

The interface specification can be automatically generated by one of the tools that creates the Asset Elements to model the code and data modules, such as the Fulcrum tool commercially available from the RMC, Ltd. Alternatively, a user may modify an existing element stored in Element Inventory 102 to create or modify an interface specification using the tools described above such as Element Viewers. An interface specification may also be created by Element Packager 118 utilizing the relationships of type "aggregation" having an Interface attribute set to "True". The creation of an interface definition for an Element Package will be discussed further below in a second example.

Once an element of element type Element Package is created, it can be viewed and managed using any of the tools and tool interfaces shown in FIG. 1 and discussed above. For example, a display of the type shown in FIG. 5 could be obtained using Relationship Viewer included in Element Viewers 144 for element "EmployeeData". This view shows all Asset Elements related to element "EmployeeData" via relationships "aggregation", that is, all elements included in the Element Package. Alternatively, any of the elements included within the Element Package, for example, element "Employee", could be selected as the selected element within the display. The display would look similar to that shown in FIG. 5 for element "Employee", except an additional relationship of type "aggregation" would be shown interconnecting element "Employee" to element "EmployeeData".

Using Element Packages to Perform Impact Analysis

As discussed above, before a change is made to a code or data module modeled by one of the elements, impact analysis should be performed to determine how this change will affect other related code and data modules. For example, if a column of a table is to be deleted, it should first be determined which program modules reference that column of the table so that these program modules may be modified to delete the reference.

One method for performing this impact analysis is by defining Element Packages that describe various functional packages of code and data modules. If a code or data module is to be changed, the element representing that module can be viewed to determine whether that element is included in any Element Packages. As discussed above, this can be determined by viewing the desired element with a Relationship View in the manner illustrated in FIG. 5 to determine if any relationships of the kind "aggregation" exist for that element. Then, by viewing the Element Package definition(s) of interest, it may be easily determined which other code and/or data module may have to be modified to maintain compatibility within a given application. Thus, the existence of Element Packages provides an easy way to use existing tools to track and manage interdependencies among the various code and data modules.

Forming Element Packages Using Other Element Packages

Element Packages may be formed using other Element Packages. That is, an element of type "Element Package" can have an aggregation relationship with another element of element type "Element Package". This can best be seen by a second example. Assume a particular transaction management system exists on one of the hosts such as Host A 228 managed by Object Management System 100. This transaction management system comprises code and data modules for performing transactions. This transaction management system may be modeled using various Asset Element types and instances of those Asset Elements stored within the EIS 103 and Element Inventory 102, respectively. Assume further that a user desires to isolate the data and code modules for a particular type of transaction performed by this transaction management system so that this type of transaction can be modeled as a single entity. To accomplish this task, the user utilizes Element Packager to create a package of elements that models the data and code modules needed to perform the particular transaction type of interest.

Figure 13:
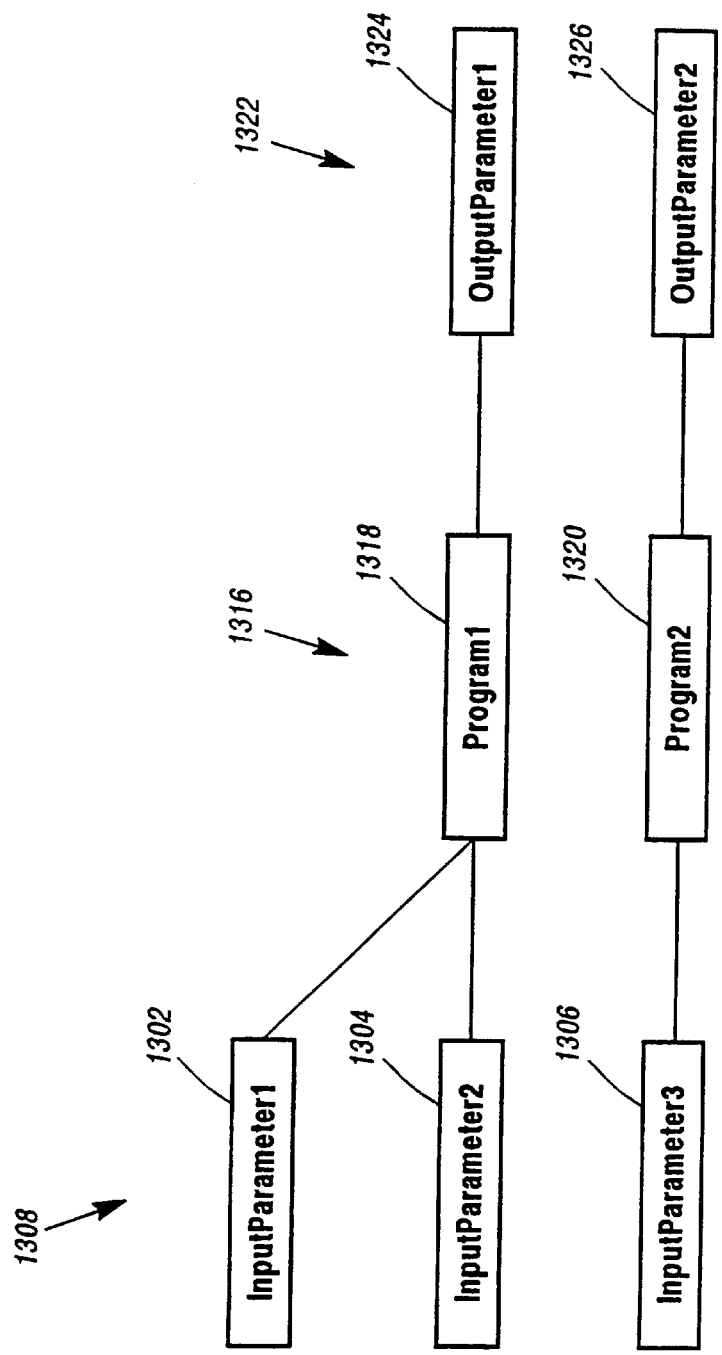
FIG. 13 is a block diagram representing the group of elements selected to model the code and data modules used to accomplish the exemplary transaction.

FIG. 13 is a block diagram representing the selected group of elements that models the code and data modules used to accomplish the exemplary transaction. The initial set of elements shown as "InputParameter1" 1302, "InputParameter2" 1304, and "InputParameter3" 1306 in Column 1308 is the set of elements that represent the input parameters to the transaction management system for the desired transaction.

The various code modules of the transaction management system are represented by the elements shown in Column 1316 as "Program1" 1318, and "Program2" 1320. These program elements are shown having various relationships to the input parameter elements. The various program elements in Column 1316 further generate various output parameters, which are represented and described by the output parameter elements shown in Column 1322 as "OutputParameter1" 1324 and "OutputParameter2" 1326.

After the user has completed selecting the elements to include in the Element Package, the user invokes the Create Package function using the "Create Package" button 708 of FIG. 7. Element Packager automatically creates an element of type "Element Package" and assigns this element the user-specified element name, which in this case will be assumed to be "Transaction1". Element Packager creates relationships of type "aggregation" with each of the Asset Elements shown in FIG. 13. Element Packager further recognizes that the elements on the edges of the graph should be exposed. This includes those elements shown in Columns 1308 and 1322 of FIG. 13. The relationships between the Element Package element and these asset elements are assigned the Interface attribute value of "True" whereas the aggregation relationships for those elements in Column 1316 are assigned the Interface attribute value of "False". Next, Element Packager 118 creates an interface definition for the newly-created element. Element Packager may accomplish this in several way. If the exposed Asset Elements do not, themselves, store interface definitions, the Asset Element names are used to create the interface definition. That is, the Asset Elements on the left-hand side of the graph are used as the input parameter list, and the asset elements on the right-hand side of the graph are used as the output parameter list. In the current example, it will be assumed the elements in Columns 1308 and 1322 do not store any interface definitions. The interface definition created by Element Packager would be similar to the following using the Asset Element names:

Function ID1 (InputParameter1:string, InputParameter2: string, InputParameter3:string), OutputParameter1:string, OutputParameter2: string)

The parameter types, which in the above example are all of type "string", are derived from a respective data type attribute stored in the associated elements of Columns 1308 and 1322. An arbitrary function id is assigned to describe the function embodied by the Element Package.

If the exposed Asset Elements do store interface definitions, those definitions are used to create the interface definition for the Element Package. Assume that in the current example, the exposed elements on the left-hand side of the graph in FIG. 13 are asset elements "Program1" 1318 and "Program2" 1320, and elements 1302–1306 are not included in the Element Package. Assume further that elements 1318 and 1320 store the following interface definitions:

Interface Definition for element "Program1":
    Function ID1 (InputParameter1:string, InputParameter2: string),
    OutputParameter1:string)
Interface Definition for element "Program2":
    Function ID1 (InputParameter:3string), OutputParameter2:string)

The input portions of these two interface definitions would be combined to create the input interface definition for the Element Package, and, assuming the elements shown in Column 1322 are still included in the Element Package, these elements in Column 1322 would be utilized to generate the output interface definition. In this case, the interface definition for the Element Package is the same as listed above, although it is derived in a different way. Finally, if the Element Package only contained the elements in Column 1316, the entire interface definition, including both the input and output parameter listings, is obtained by combining the interface definitions stored in elements 1318 and 1320.

Figure 14:
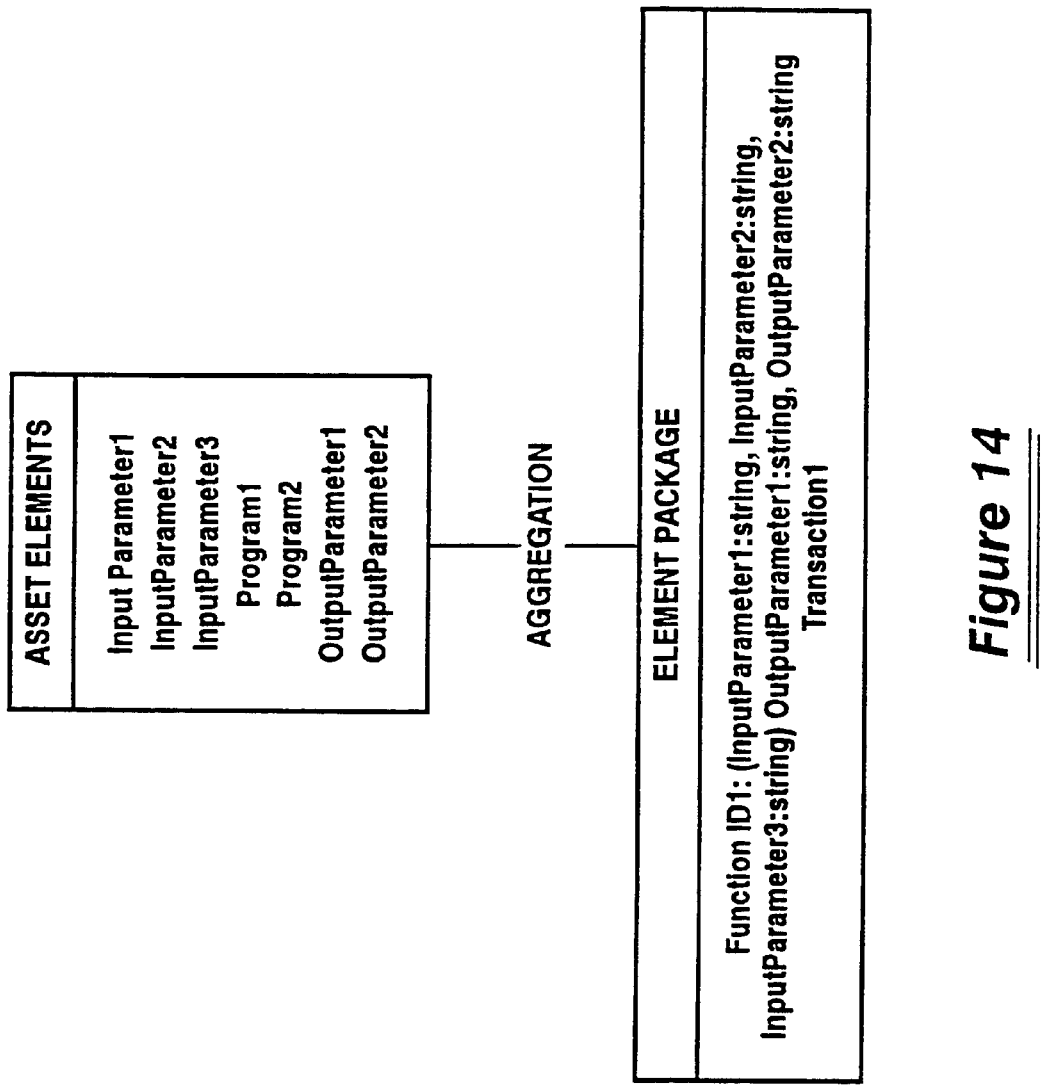
FIG. 14 is a diagram of the Element Package created for the element "Transaction1", including the interface definition.

FIG. 14 is a diagram of the Element Package created for the element "Transaction1", including the interface definition. The Element Package definition of element Transaction1 can be used by a programmer to determine how a code wrapper is to be created. That is, a software engineer entirely unfamiliar with the interrelationships existing between the code and data modules modeled by the package need only understand the interface definition for the Element Package to design the code module which will "wrap" the transaction, thereby making the transaction callable from within a different data processing environment. Thus, the Element Package models the functions performed by the included elements in a way that simplifies the task of an engineer designing interfacing code and/or data modules.

In the current example, the interface definition may be used to design the code module that will perform the wrapping function. Thereafter, an Asset Element may be created to describe the newly-created code module "wrapper". This newly-created Asset Element, which will be called "MTS_Wrapper" for exemplary purposes, can then be used along with the element "Transaction1" to define a second Element Package, which in this example will be called "MTS_Transaction1", which might be the version of a legacy transaction that is callable from within an MTS environment using the newly-created code module.

Figure 15:
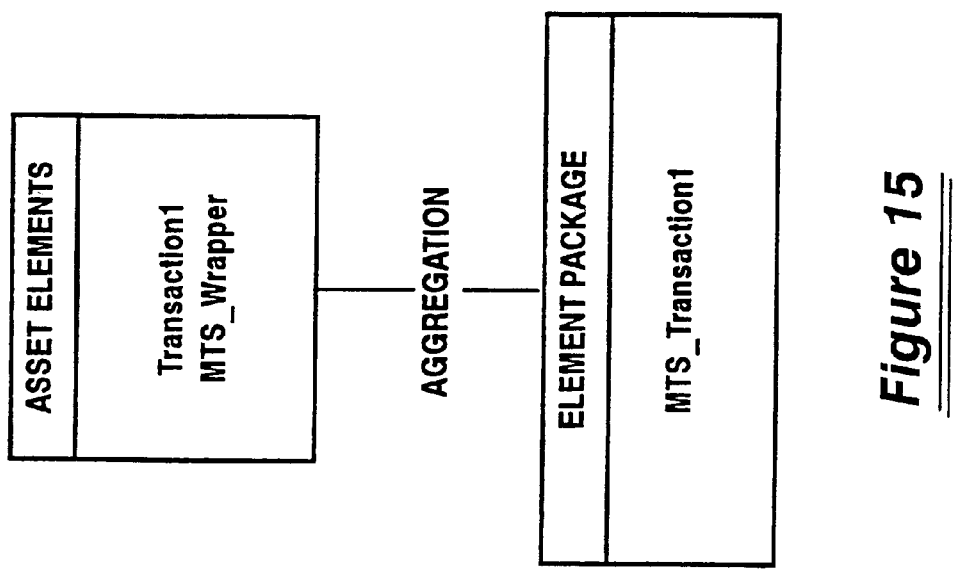
FIG. 15 is a diagram of the Element Package for "MTS__Transaction1" that contains Element Package "Transaction1"

FIG. 15 is a diagram of the Element Package for "MTS_Transaction1" that contains Element Package "Transaction1". In a similar manner, Element Package "MTS_Transaction1" could be included in an Element Package, and so on. Any number of levels of nesting may be utilized in the Element Package definitions. The relationships created between Element Package elements may be used to perform impact analysis in a manner similar to that described above. That is, if an Asset Element is to be changed, the one or more Element Packages containing the Asset Element may be analyzed. If the change to the Asset Element affects the Element Package interface definition, additional analysis is needed to determine how the change affects the Element Packages that include the affected Element Package, (and, in turn, how the change affects the code and data modules modeled by any affected Element Package.)

The above example illustrates the manner in which Element Packages are used to develop code wrappers. Once a basic group of code and data modules are identified using the associated elements as shown in FIGS. 13 and 14, the identification process does not need to be repeated. The functionality modeled by the Element Package may be used multiple times to develop multiple code wrappers. The relationships and elements included in the Element Package are hidden, and only the relationships that are of interest to the "external world" need be considered. This makes the relevant code and data relationships associated with the wrapping function easier to conceptualize. Moreover, once created, the Element Packages are available for reuse. For example, the user may include the same element "Transaction1" in more than one package, with each of the packages being associated with a different wrapper for a different data processing environment. That is, once the user has determined a core group of code and data modules using the element definitions, this Element Package can be associated with different code wrappers without having to re-verify that all the necessary code and data modules, and all of the associated interfaces have been considered. This saves a considerable amount of time.

Figure 16:
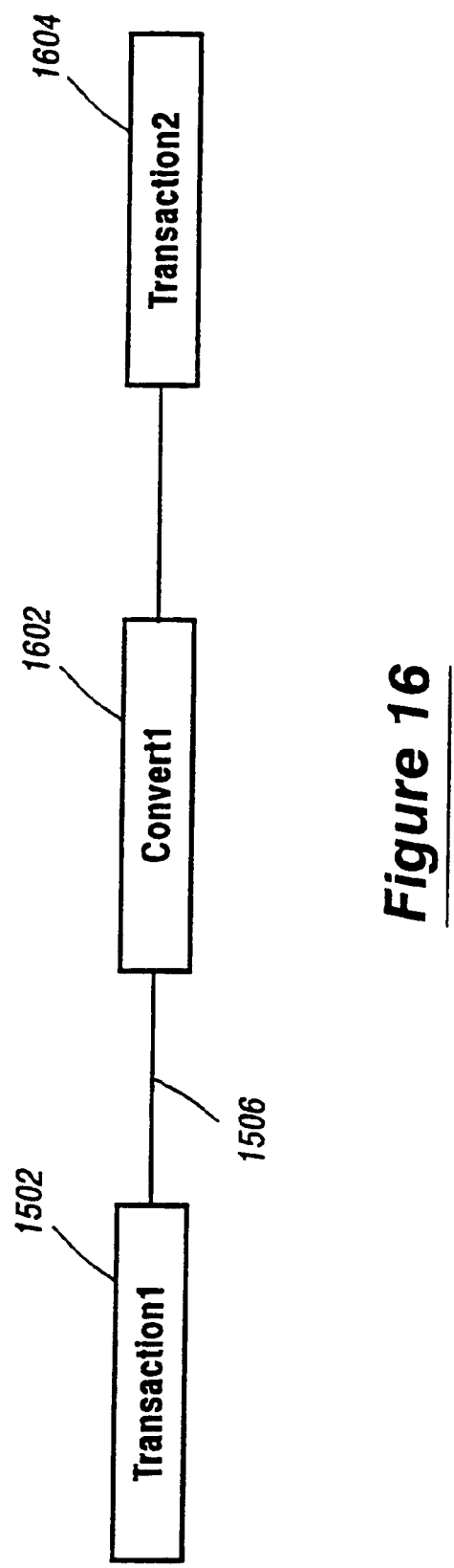
FIG. 16 is a block diagram illustrating yet another example of the creation of Element Packages, and shows how multiple Element Packages may be used to create an Element Package.

FIG. 16 is a block diagram illustrating yet another example of the creation of Element Packages, and shows how multiple Element Packages may be used to create an Element Package. Assume the output parameters from the first transaction represented by element "Transaction1" 1502 are to be provided to a newly-created code module. These parameters are re-formatted, then provided as input parameters to a transaction management system to perform a second type of transaction. Assume further that the new code module is modeled by an asset element called "Convert1" 1602. Also, the second type of transaction is modeled by the data and asset elements included in a second Element Package called "Transaction2" 1604. The overall transaction, including transactions one and two, is modeled by an Element Package called "Transaction3". Element Packager 118 creates the interface definition for this Element Package by using the input portion of the interface definition for asset element "Transaction", and using the output portion of the interface definition for asset element "Transaction2".

Figure 17:
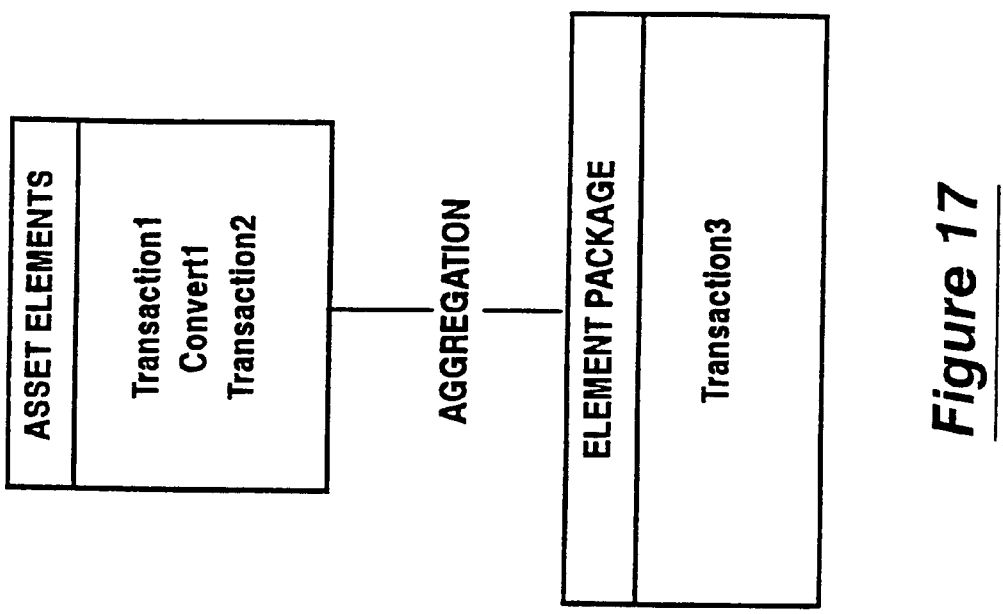
FIG. 17 is a diagram of Element Package "Transaction3", and illustrates the use of multiple Element Packages to create another Element Package.

FIG. 17 is a diagram of Element Package "Transaction3", and illustrates the use of multiple Element Packages to create another Element Package.

Figure 18A:
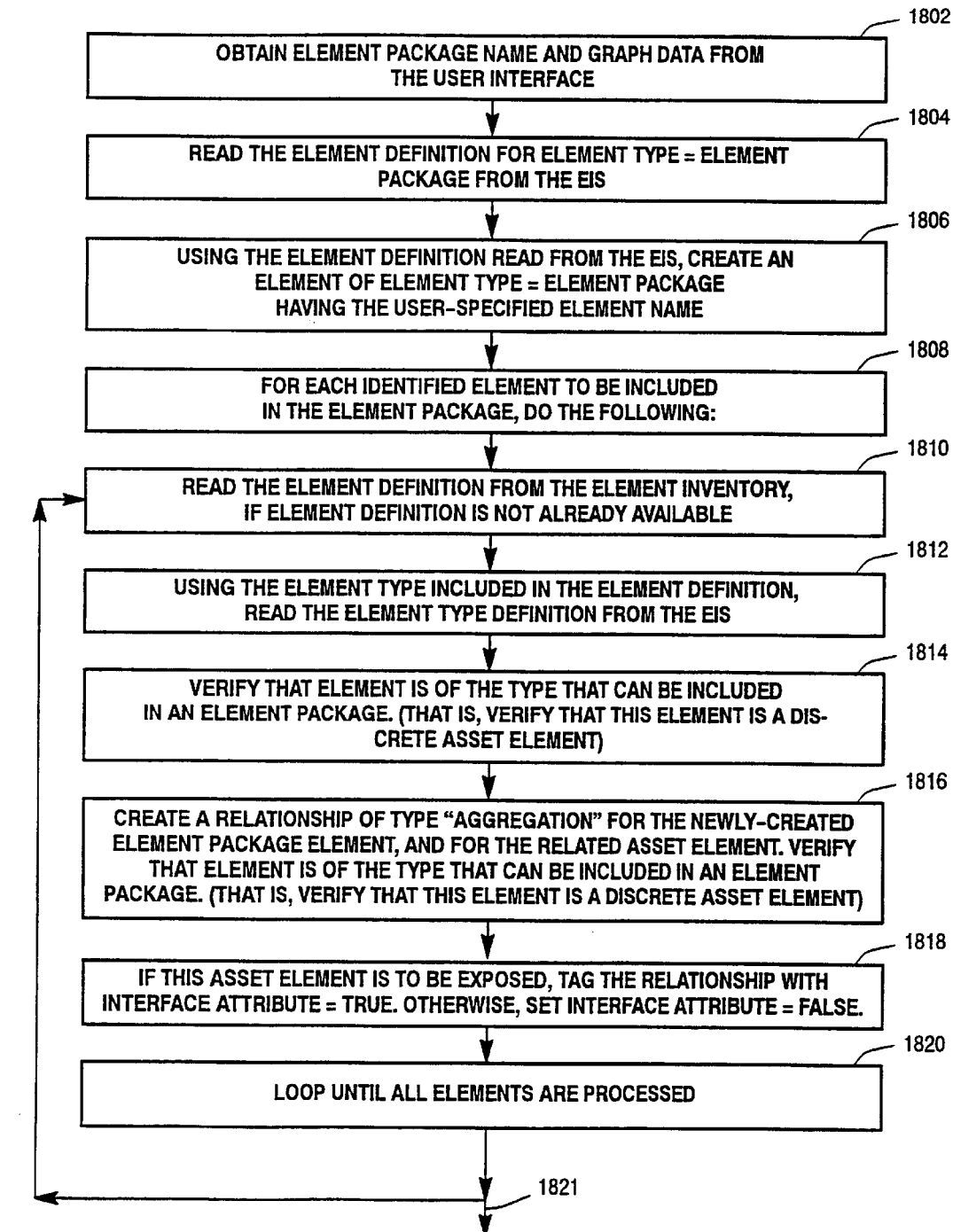
FIGS. 18A and 18B, where arranged as shown in FIG. 18, are a flow diagram of the process used by Element Packager 118 to create Element Packages.
Figure 18B:
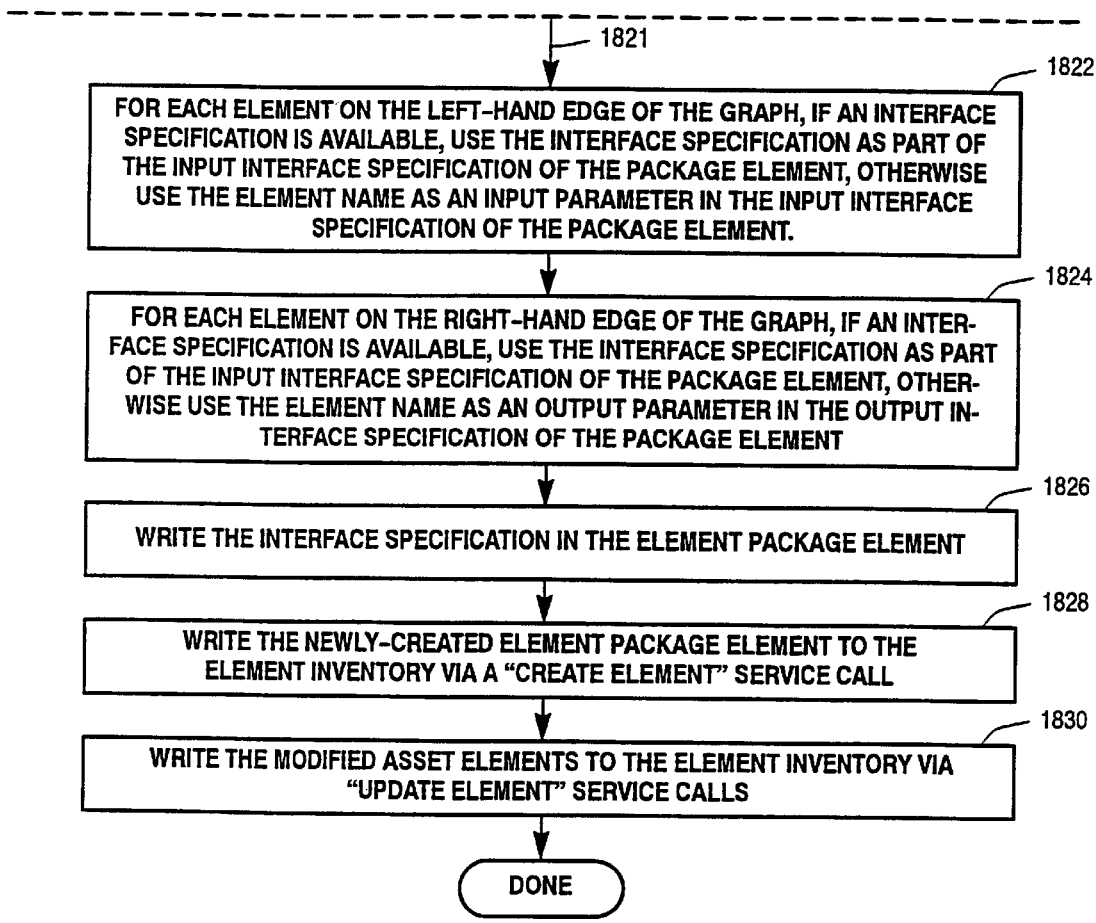

FIGS. 18A and 18B, where arranged as shown in FIG. 18, are a flow diagram of the process used by Element Packager 118 to create Element Packages. In Step 1802, Element Packager retrieves information from the user interface such as the list of elements selected for inclusion in the package, the spatial relationships, and the name provided by the user for the Element Package element. In Step 1804, Element Packager retrieves the definition for the element type "Element Package" from the EIS 103 via a "Get Element Types" service call. Step 1806 illustrates the creation of a template for the newly-created Element Package element using the definition retrieved in Step 1804. Next, for each element identified by the user for inclusion in the Element Package, the element is processed according to a set of predetermined steps as shown in Step 1808. First the element definition is read from the Element Inventory, if that definition is not already located in local memory for the Element Packager. This is shown in Step 1810. Next, the element type definition is retrieved from the EIS for the element retrieved in Step 1810 if it is not already available in local memory. This is shown in Step 1812. This element type definition is used to verify that the relationship type "aggregation" is valid for the current element and that the element can be included in an Element Package, as shown in Step 1814. If the relationship type is valid for the current element, that is, the element is an Asset Element, relationship data is stored in both the newly-created Element Package element and in the related element indicating the creation of the relationship of type "aggregation". This is indicated by Step 1816. Depending on the spatial relationship of the related element as obtained from the user interface display, Element Packager determines if the related element is to be exposed. If it is, the newly-created relationship is tagged with an Interface Attribute of "True". Otherwise, the Interface Attribute is set to "False". This is illustrated in Step 1818. These steps are repeated for each identified element to be included in the Element Package, as indicated by Step 1820. As indicated by Arrow 1821, processing then continues to FIG. 18B.

Next, the interface specification is created using the elements on the left-hand side of the graph to create the input interface specification, and using the elements on the right-hand side of the graph to create the output interface specification, as shown in Steps 1822 and 1824, respectively. The interface specification will be created by combining the interface specifications of the exposed elements. For any of the elements that do not have interface specifications, the element names themselves will be incorporated into the interface specification. The interface specification will be stored in the template for the Element Package element, as described in Step 1826. The newly-created Element Package element is written to Element Inventory 102 via a "Create Element" AIM EXE service call, and the modified element structures for those elements included in the Element Package are written back to Element Inventory 102 using an "Update Element" AIM EXE service call. This is shown in Steps 1828 and 1830, respectively.

The above description discusses the manner in which Element Packages may be used to create code wrappers and to perform impact analysis. Element Packages are also useful in systems employing component consumers and component producers as a way of making predetermined functions available to requesters. As is known in the art, a component consumer is a software process that will, in response to a user request or a request of some automated system, broadcast a request for a software module, or component, that is capable of performing a particular set of functions, and that has a predetermined interface. Requests of this nature will be received by component producers, which are software processes that will locate one or more existing software modules that meet the specified criteria, and will then return the names of these modules to the component consumer for use by the requester. A system administrator may utilize the Element Packager to define packages of elements that model groups of code and data modules, wherein each group performs a common function likely to be requested by a component consumer. The component producer can utilize the interface specifications stored in the elements to determine which packages are candidates for a request provided by a component consumer so that the name of the Element Package can be passed back to the component consumer. Thereafter, the group of code and data modules defined by the Element Package can be analyzed, either by an automated process or by human intervention, to determine the appropriateness of the match. Alternatively, if an Element Package does not already exist for the requested function, the component producer can utilize the interface specification stored in any asset elements, including other Element Packages, to determine which elements might likely be combined to provide the requested interface and functionality. This list may then be utilized by a system administrator who may then build the appropriate Element Package with all necessary elements for use by the requesting code module.

In addition to the above-described uses, Element Packages may also be used to identify a reusable group of code and data modules that may be ported to one or more other platforms, or which may become the target of one or more renovation operations. For example, the identified group may become the target of a "Y2K" or "Euro" renovation operations.

Because the packages are reusable, the user need only go through the process of defining the Element Package once. Moreover, since the packages may be incorporated in other packages, the task of understanding highly complex element relationships is greatly simplified. Finally, because the Element Packages are defined as Asset Elements using the same type of element definitions that define any other elements, all tools available within Object Management System 100 can be utilized to management, define, and view the Element Packages.

Having described an exemplary embodiment of the invention in the drawings and accompanying description, those skilled in the art will recognize that various modifications to the exemplary embodiment could be made without departing from the scope and spirit of the claims set forth below:

What is claimed is:

1. For use in a object management system having an object repository memory, the object management system for modeling software constructs by storing in the object repository memory, for each of the software constructs, a respective element including data signals descriptive of a respective one of the software constructs, wherein said ones of the software constructs having predefined functional relationships with one or more other related ones of the software constructs, and wherein each of the predefined relationships are modeled by storing in the object repository memory a respective relationship indicator representing an element relationship between respective elements modeling the related ones of the software constructs, a system for creating and managing reusable groups of software constructs, comprising:

user interface means for providing an indication to a user of a selected set of elements, and for providing an indication of any respective element relationship existing between an element in said selected set of elements and a related one of the elements, and further for providing an indication of any said related one of the elements;

element selection means for allowing a user to determine which of any said related one of the elements to be included within, or omitted from a user selected set of elements selectable by said user from said selected set of elements, and whereby said user interface means provides, for any said related one of the elements included within said selected set of elements, an indication to said user of any said respective element relationship, and further for providing an indication of any said related one of the elements; and package creation means for storing in the object repository memory an indication that all elements in said selected set of elements are included in a package element created by said package creation means from said user selected set of elements and from said indication that all elements in said selected set of elements are included.

2. The system of claim 1, and further comprising element identification means for identifying an initial set of elements to be included in said selected set of elements, whereby each element in said initial set of elements models a respective software construct associated with a predetermined software function wherein said predetermined software function is selectable by said user.

3. The system of claim 1, wherein said user interface means includes display means for graphically displaying said selected set of elements, for graphically displaying said any respective element relationship existing between any element in said selected set of elements and a related one of the elements, and further for displaying each said related one of the elements.

4. The system of claim 1, wherein said element selection means includes filter means for allowing a logical expression to be specified that can be applied against the data signals included within each said related one of the elements to determine whether said each related one of the elements is to be included within, or omitted from, said selected set of elements.

5. The system of claim 4, wherein each element may include attribute data signals descriptive of the respective one of the software constructs, and wherein said filter means includes attribute filter means for allowing said logical expression to be specified in terms of said attribute data signals included within any said related one of the elements.

6. The system of claim 4, wherein said filter means includes relationship filter means for allowing a logical expression to be specified in terms of any relationship indicator indicating a relationship between any said related one of the elements and any respective one of said selected set of elements.

7. The system of claim 1, wherein said package creation means includes element creation means upon creating an element that is a package element, said package creation means further for creating as an aggregation relationship an element relationship between said package element and each respective element in said selected set of elements.

8. The system of claim 7, wherein the set of software constructs modeled by said selected set of elements has a predefined external interface, and wherein said package creation means includes relationship attribute means for designating predetermined ones of said aggregation relationships as interface element relationships, wherein each said interface element relationship indicates that the software construct modeled by a respective element associated with said each interface element relationship has a predefined functional relationship to one or more other related ones of the software constructs, and wherein said predefined functional relationship is used to define said predefined external interface.

9. The system of claim 8, wherein said package creation means includes interface specification creation means for creating for each said package element a package interface specification describing said predefined external interface, said interface specification being created using said interface element relationships.

10. The system of claim 9, wherein predetermined ones of the elements in said selected set of elements may each include as ones of the data signals a respective element interface specification describing an external interface for the respective software construct, and wherein said interface specification creation means includes means for using said respective element interface specification for a respective element associated with any said interface element relationship to create said package interface specification.

11. In an object management system for cataloging and managing software constructs, wherein each of the software constructs is associated with one or more respective functions, the object management system having a repository to store objects, each of the objects to model a respective one of the software constructs and each to include data signals descriptive of the respective one of the software constructs, wherein predetermined ones of the software constructs are related ones of the software constructs each having an interdependency with one or more other related ones of the software constructs, each interdependency modeled by an object relationship stored in the repository and existing between respective related ones of the objects modeling the related ones of the software constructs, a method of defining a reusable group of the software constructs, comprising the steps of:

a) selecting a set of objects, each of the objects in said set of objects modeling a respective one of the software constructs associated with a user-specified one of the functions;

b) identifying, for each of the objects in said set of objects, any respective related ones of the objects;

c) adding predetermined identified ones of the objects identified in step b) to said set of objects;

d) repeating steps a–c until said set of objects includes all objects that model a respective one of the software constructs that a user determines is necessary to implement said user-specified one of the functions, and e) adding a package object to said repository.

12. The method of claim 11, wherein said step (b) includes the step of identifying, for each of the objects in said set of objects, any object relationship existing between said each of the objects in said set and any respective related ones of the objects.

13. The method of claim 12, wherein said step (c) includes the step of selectively adding said predetermined identified ones of the objects to said set of objects by specifying selected ones of the object relationships identified in said step (b) that are associated with said predetermined identified ones of the objects.

14. The method of claim 13, wherein said step (c) includes the step of defining a filter for automatically specifying said selected ones of the object relationships.

15. The method of claim 14, wherein said filter of said step (c) includes Boolean operators.

16. The method of claim 11, wherein ones of the data signals included in each of the objects may be attribute signals indicative of an attribute associated with the respective one of the software constructs, and wherein said step (c) includes the step of selectively adding said predetermined identified ones of the objects to said set of objects based on values of the attribute signals stored in said predetermined identified ones of the objects.

17. The method of claim 16, wherein said step (c) further includes the step of defining a filter for automatically specifying said values of the attribute signals.

18. The method of claim 17, wherein said filter of said step (c) includes Boolean operators.

19. The method of claim 11, and wherein said step (e) comprises recording within the repository which objects are included in said set of objects.

20. The method of claim 19, wherein the recording step includes the step of creating as a package object an object modeling said set of objects, wherein said package object is stored in the repository.

21. The method of claim 20, wherein the recording step further includes the step of creating, for each of the objects in said set of objects, an object relationship existing between said package object and said each of the objects in said set of objects, said object relationship being stored in the repository.

22. The method of claim 21, wherein said user-specified one of the functions may be described by an interface specification defining an external callable interface of said user-specified one of the functions, and wherein ones of said object relationships created between said package object and said each of the objects in said set of objects are designated as interface object relationships for use in modeling said interface specification.

23. The method of claim 22, wherein said interface specification is stored as ones of the data signals included in said package object.

24. The method of claim 20, wherein said set of objects that includes all objects modeling a respective one of the software constructs that is necessary to implement said user-specified one of the functions may include one or more of said package objects.

* * * * *